(12) United States Patent
Counne

(10) Patent No.: US 12,453,318 B2
(45) Date of Patent: Oct. 28, 2025

(54) APPARATUS, SYSTEM AND METHODS FOR IMPROVED VERTICAL FARMING

(71) Applicant: WILDER FIELDS, LLC, Calumet City, IL (US)

(72) Inventor: Jacob David Counne, Chicago, IL (US)

(73) Assignee: Wilder Fields, LLC, Calumet City, IL (US)

( * ) Notice: Subject to any disclaimer, the term of this patent is extended or adjusted under 35 U.S.C. 154(b) by 0 days.

(21) Appl. No.: 18/921,860

(22) Filed: Oct. 21, 2024

(65) Prior Publication Data
US 2025/0113793 A1  Apr. 10, 2025

Related U.S. Application Data

(63) Continuation of application No. 18/529,464, filed on Dec. 5, 2023, now abandoned, and a continuation of
(Continued)

(51) Int. Cl.
*A01G 31/04* (2006.01)
*A01G 7/04* (2006.01)
(Continued)

(52) U.S. Cl.
CPC .......... *A01G 31/042* (2013.01); *A01G 7/045* (2013.01); *A01G 9/0295* (2018.02); *A01G 9/143* (2013.01); *A01G 27/003* (2013.01); *A01G 9/247* (2013.01)

(58) Field of Classification Search
CPC ...... A01G 31/042; A01G 31/04; A01G 9/022; A01G 9/023; A01G 9/143; A01G 31/06; A01G 2031/006
See application file for complete search history.

(56) References Cited

U.S. PATENT DOCUMENTS 2,051,461 A * 8/1936 Lee .............. A01G 31/06
47/60
2,896,374 A * 7/1959 Perin ............ A01G 31/06
47/62 R
(Continued)

FOREIGN PATENT DOCUMENTS

DE  4004154 A1 * 8/1991 ........... A01G 9/143

OTHER PUBLICATIONS

DE-4004154-A1 Text (Year: 1991).*

*Primary Examiner* — Katelyn T Truong
(74) *Attorney, Agent, or Firm* — Patzik, Frank & Samotny Ltd

(57) ABSTRACT

The present disclosure is directed to improved vertical farming using autonomous systems and methods for growing edible plants, using improved stacking and shelving units configured to allow for gravity-based irrigation, gravity-based loading and unloading, along with a system for autonomous rotation, incorporating novel plant-growing pallets, while being photographed and recorded by camera systems incorporating three dimensional/multispectral cameras, with the images and data recorded automatically sent to a database for processing and for gauging plant health, pest and/or disease issues, and plant life cycle. The present disclosure is also directed to novel harvesting methods, novel modular lighting, novel light intensity management systems, real time vision analysis that allows for the dynamic adjustment and optimization of the plant growing environment, and a novel rack structure system that allows for simplified building and enlarging of vertical farming rack systems.

9 Claims, 18 Drawing Sheets

Related U.S. Application Data application No. 18/155,502, filed on Jan. 17, 2023, now abandoned, said application No. 18/529,464 is a continuation of application No. 18/155,502, filed on Jan. 17, 2023, now abandoned, which is a continuation of application No. 17/116,763, filed on Dec. 9, 2020, now abandoned, which is a continuation of application No. 15/965,534, filed on Apr. 27, 2018, now abandoned.

(60) Provisional application No. 62/539,163, filed on Jul. 31, 2017, provisional application No. 62/490,822, filed on Apr. 27, 2017.

(51) Int. Cl.
  *A01G 9/029* (2018.01)
  *A01G 9/14* (2006.01)
  *A01G 9/24* (2006.01)
  *A01G 27/00* (2006.01)

(56) References Cited

U.S. PATENT DOCUMENTS

| | | | | | |
|---|---|---|---|---|---|
| 2,940,218 | A | * | 6/1960 | Carter | A01G 31/06 137/132 |
| 2,952,096 | A | * | 9/1960 | Hughes | A01G 31/06 47/60 |
| 3,328,912 | A | * | 7/1967 | Poon | A01G 31/06 47/61 |
| 3,608,240 | A | * | 9/1971 | Gunn | A01G 31/06 47/79 |
| 3,772,827 | A | * | 11/1973 | Ware | A01G 9/022 D6/558 |
| 4,676,023 | A | * | 6/1987 | Mori | B01F 23/232311 47/79 |
| 5,252,108 | A | * | 10/1993 | Banks | A01G 9/143 47/17 |
| 5,822,920 | A | * | 10/1998 | Tsay | A01G 31/06 47/60 |
| 6,095,347 | A | * | 8/2000 | Mauro-Vetter | B65G 1/02 211/151 |
| 2004/0163308 | A1 | * | 8/2004 | Uchiyama | A01G 9/249 257/E33.059 |
| 2014/0017043 | A1 | * | 1/2014 | Hirai | A01G 31/02 414/267 |
| 2014/0090295 | A1 | * | 4/2014 | Fambro | A01G 31/06 47/62 N |
| 2016/0192607 | A1 | * | 7/2016 | Kitagawa | A01G 31/06 47/62 N |
| 2017/0208760 | A1 | * | 7/2017 | Lodge | A01G 31/042 |
| 2017/0258022 | A1 | * | 9/2017 | Nedbálek | A01G 31/06 |
| 2018/0054977 | A1 | * | 3/2018 | Fok | A01G 7/045 |

\* cited by examiner

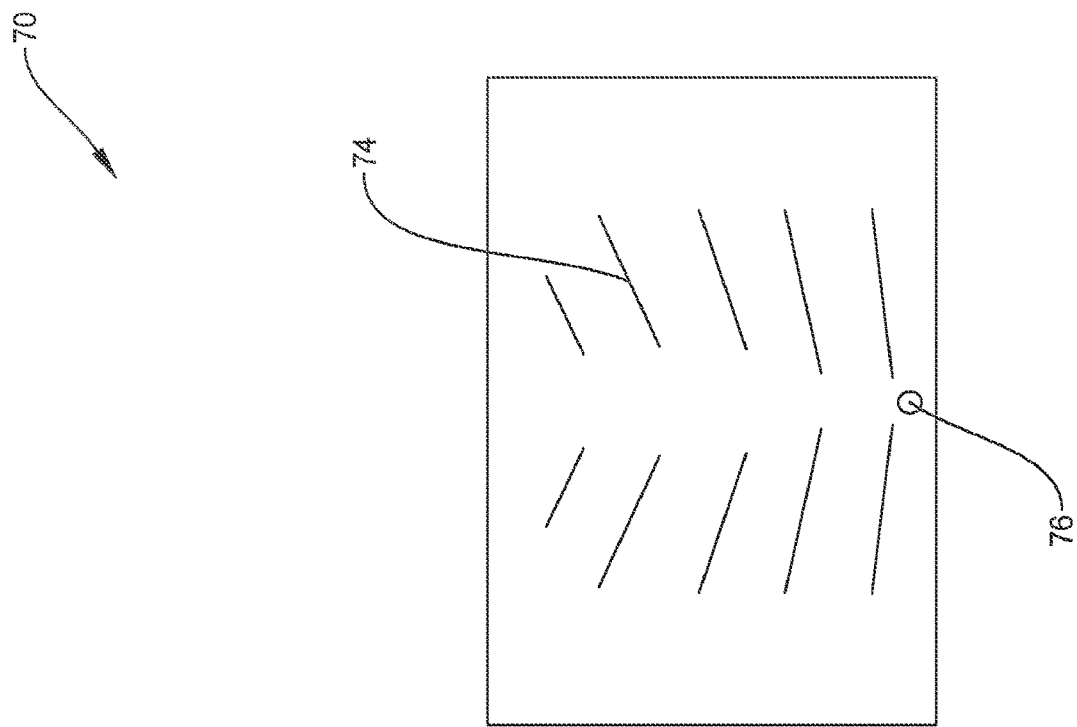
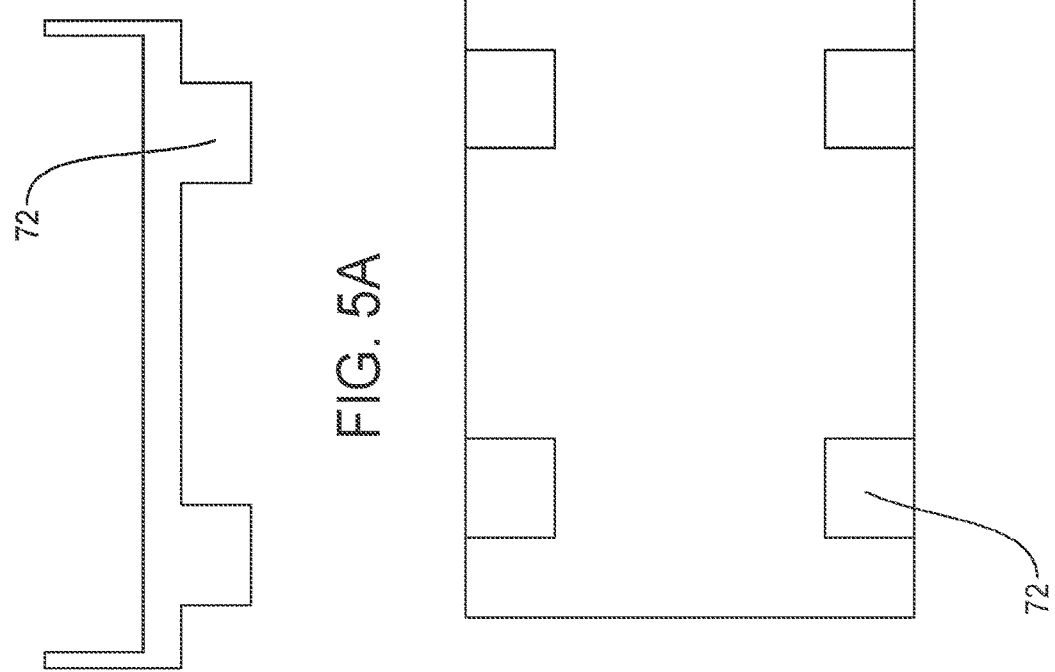
FIG. 5A
FIG. 5B
FIG. 5C

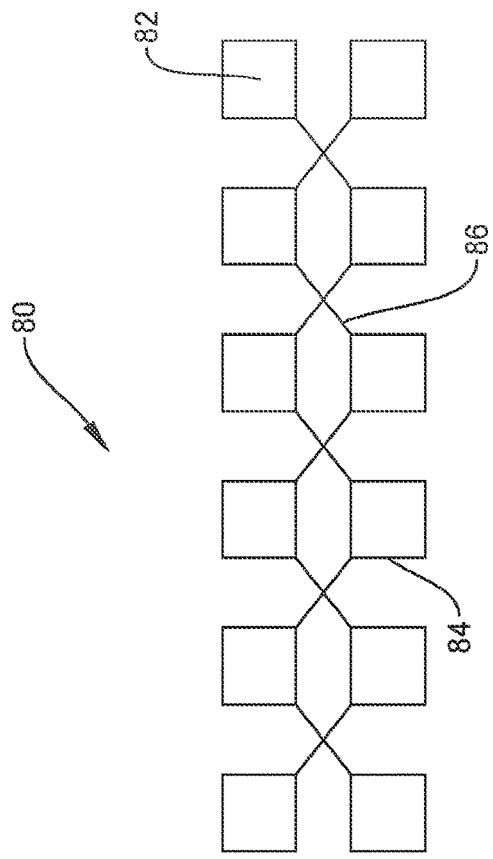
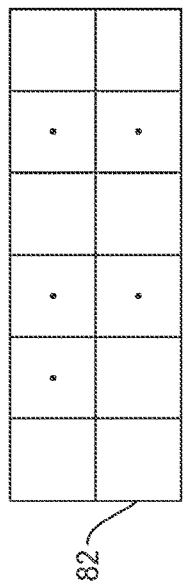
FIG. 6A
FIG. 6B
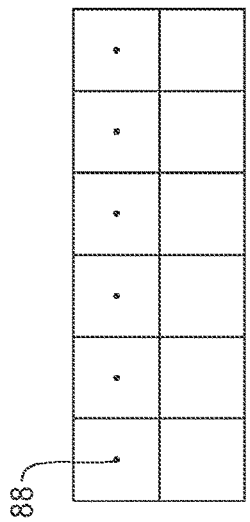
FIG. 6C

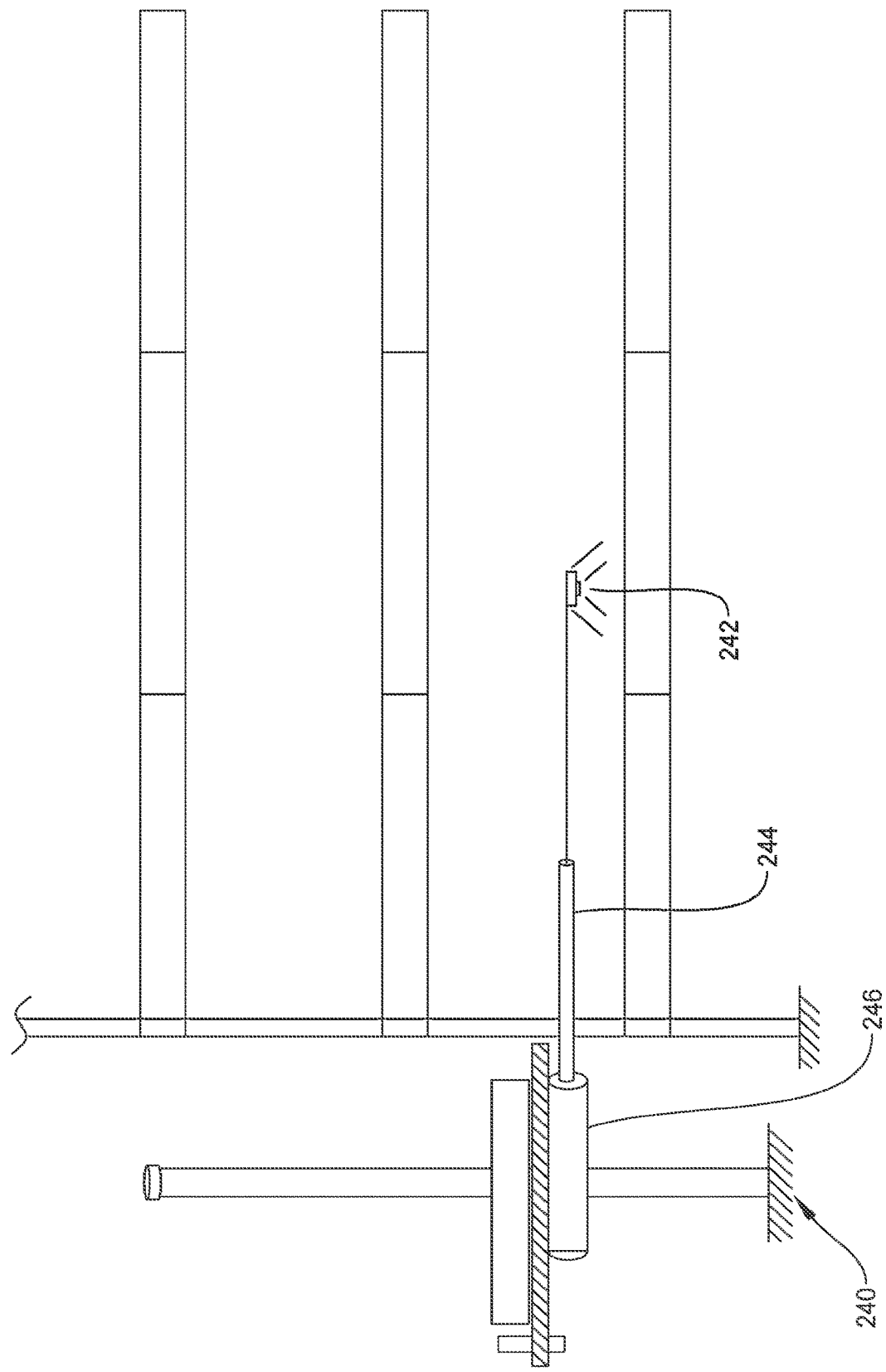

APPARATUS, SYSTEM AND METHODS FOR IMPROVED VERTICAL FARMING

CROSS-REFERENCE TO RELATED APPLICATIONS

This application is a continuation of U.S. Non-Provisional patent application Ser. No. 18/529,464, filed Dec. 5, 2023, now pending, which is a continuation of U.S. Non-Provisional patent application Ser. No. 18/155,502, filed Jan. 17, 2023, now abandoned, which is a continuation of U.S. Non-Provisional patent application Ser. No. 17/116,763, filed Dec. 9, 2020, now abandoned, which is a continuation of U.S. Non-Provisional patent application Ser. No. 15/965,534, filed Apr. 27, 2018, now abandoned, which claim priority to U.S. Provisional Patent Application No. 62/539,163 filed Jul. 31, 2017, entitled APPARATUS, SYSTEMS AND METHODS FOR IMPROVED VERTICAL FARMING, and U.S. Provisional Patent Application No. 62/490,822, filed Apr. 27, 2017, entitled APPARATUS, SYSTEMS AND METHODS FOR IMPROVED VERTICAL FARMING, and, all of which are hereby incorporated by reference in their entirety as though fully set forth herein.

FIELD OF THE DISCLOSURE

The present disclosure relates to an apparatus, system and methods for improved vertical farming, including improved farming shelves and racks, efficient transport of grow trays, which utilize a cluster system, novel plant-grow trays or pallets, which allow for combined optimal plant growth and irrigation methods, novel harvesting methods, novel modular lighting, novel light intensity management systems, real time vision analysis that allows for the dynamic adjustment and optimization of the plant growing environment, novel camera mobility systems, and a novel rack structure system that allows for simplified building and enlarging of vertical farming rack systems.

The present disclosure also relates to the improvement of autonomous systems and methods for growing edible plants, using improved scalable stacking and shelving units configured to allow for scaling or increasing the size of the system through additional shelving units. The disclosed shelving units utilize gravity-based irrigation, along with novel water supply and draining, gravity-based loading and unloading of the plant-growing trays and camera system, along with a cluster-based shuttle system for autonomous rotation, incorporating novel plant-growing and germination trays. This system significantly reduces the amount of labor required to tend to a vertical farm.

The present disclosure further relates to a system that photographs and records the plant life cycle by 1) high definition cameras located on telescoping poles using one or more gimbals to allow the cameras to record each plant, the telescoping system capable of transport between shelves; 2) a camera vehicle attached to a rail or rail system above the plant-grow trays, capable of independent movement to record each plant; and/or 3) autonomous flying drones, incorporating three dimensional/multispectral cameras, flying preprogrammed routes, thereby reducing or eliminating certain labor costs. Multiple cameras can also be permanently mounted onto the vertical farming system in other strategic places as described herein. The result is to record images and/or video of the growing plants, automatically analyze these images and videos in real-time, thereby understanding exactly what the plant needs for optimal growth, while retaining the database for future plant growth. This will allow the plant itself to become the "sensor," controlling its own environment, thereby continually optimizing its own growing environment and reducing the energy needed to obtain the maximum production. By utilizing these novel methods of camera transport, we can significantly increase the amount of plants that can be monitored autonomously, while significantly decreasing the expense associated with purchasing multiple cameras.

The present disclosure further relates to cameras, such as 3D cameras, that may be mounted on a gyroscopic stabilizer to obtain clean and precise images and video of the growing plants. The cameras may also comprise additional sensors to obtain information about the vertical farming infrastructure. The cameras may be Wi-Fi enabled, or in other ways wirelessly connected or wired directly to the system for automatically transmitting the recorded images and data to a database in the vertical farming system for processing and for gauging plant health, biotic and abiotic stresses, pest and/or disease issues, and plant life cycle, along with determining the acceptability of the vertical farming system.

Also, in the present disclosure, lighting bars and/or LED sheets are integrated into a lighting platform, which is dynamically connected to the shelving system that maintains a constant (or near-constant) photosynthetic flux density (PPFD) exposure to plant canopies throughout plant growth stages. The lighting platform is outfitted with infrared sensors, ultrasonic sensors, and/or other sensors, and configured to autonomously be raised and lowered above the grow trays using an integrated motor, driveshaft, cabling, and/or gears. In an embodiment, the motor and gears drive or rotate a shaft to spool or unspool cabling fastened to lighting bars and/or LED sheets via pulley and/or gear systems. Other methods for raising and lowering the lighting platform above the grow trays can be incorporated into the system within the scope of the present disclosure.

In the present disclosure, the lighting platform supports the integration of individual sensors and/or sensor systems utilizing local processing for data analysis and storage, and wireless communication schema for remote data collection, storage, and analysis, using, for example, machine learning and/or artificial intelligence. Sensors include, but are not limited to, temperature, humidity, distance (e.g., ultrasonic, infrared) and optical (e.g., photodiodes, photoresistors, phototransistors, ultraviolet-cameras, visible spectrum cameras, near-infrared cameras, infrared cameras, thermographic cameras). As described herein, the camera(s) could be mounted to the lighting platform, and when the system desires to capture an image or video, the lighting platform will autonomously raise to an appropriate height to capture as many of the plants in a particular grow tray, or on a shelf, as possible, and then autonomously return to the height most appropriate for optimal plant growth. The motor and/or sensors or sensor systems provide feedback to the vertical farming system as to the distance the lighting bars and/or LED sheets are from the growing plants.

In the Present disclosure, sensors can also provide information about the plant environment, plant condition, plant life cycle, pest conditions, plant health, etc. A history can be generated, and along with the information from sensors, obtained during the entire life of the plants from seed to harvest, the history can be included in a database of all of the similar or dissimilar plants for optimizing the growth of the plants.

In addition to creating an optimal plant growing environment, the present disclosure also relates to utilization of the lighting platform representing both labor and energy savings. Based on the plant canopy's height at any point in the plant's life cycle, the lighting platform autonomously adjusts the lighting fixture height above crops/trays to maintain a constant, optimal position throughout crop growth cycle, thereby eliminating the need for daily, manual adjustments. As described, the lighting platform allows for lighting fixtures to be positioned at a minimum distance from crops/trays (i.e., less than six inches above canopy for lighting platform compared with over twenty four inches for stationary lighting fixtures). By maintaining the lighting fixtures at a minimal height above crops/trays, the system can utilize less powerful (i.e., lower wattage) lighting fixtures (or standard-power lighting fixtures), at lower power consumption rates through dimming schema. By maintaining this minimum light fixture height autonomously, one can produce the required light intensity needed for plants to grow efficiently at significantly less wattage, and therefore significantly less cost. This resolves one of the major expenses in the vertical farm industry: high power consumption. It also enables us to grow crops that are currently thought to be too "energy intensive", such as wheat, at a significantly lower expense.

The present disclosure further relates to a novel rack structure manufacturing system for vertical farming in which parts and material, such as extruded aluminum or extruded plastic, are used for transporting and transferring irrigation, energy, materials and environments from one place to another. By using predesigned extruded aluminum for example, hollow cavities reduce or eliminate the need for separate conduit, ducts or connections. As such, the rack structure system of the present disclosure can be designed to be originally built, or later enlarged, without the need for designing separate conduit for transporting items necessary for the plant-growing cycle. As the rack system is built or enlarged, each extruded piece connects with the other pieces, using the predesigned hollow cavities to create the necessary conduit, ducts or connections. This will allow the entire shelving system to function as a large, simple appliance, with one input for electricity, one input for water, and one input for air, as well as other built-in mounting points and rails for camera systems. This will significantly reduce the cost and complexity of existing vertical structure designs.

The present disclosure further relates to a novel harvesting system in which the plants are harvested in their plant-grow trays. Instead of the manual harvesting process, the present disclosure relates to a harvest in place process or system. For example, currently a full head of lettuce is cut at its base to detach it from where it has grown. The leaves are then removed from the head until the core remains, which is then discarded. The process involves many steps, many of which are manual. The present disclosure eliminates a substantial portion of the process by harvesting the plant while in place ("harvest in place"), by knowing exactly where the center of each plant site is located, due to the grow tray lid with predetermined plant spacing, the plant can be cored in the grow tray, reducing a number of the steps and reduce the need to transport product.

The present disclosure relates to a harvesting press. The harvesting press would be a similar or same size as the grow tray, with corers strategically mounted in a mirror image of the plant sites in the grow tray. The corers could vary in diameter based on the particular crop being harvested and could also spin, to make the coring process simpler. The harvesting press would drop down in a single motion against the grow tray, simultaneously coring all of the plant sites, resulting in the cores remaining in their sites, and the loose leaves separated on the tray. The leaves can then be easily removed for additional processing or packaging.

The present disclosure further relates to an articulating harvester. The articulating harvester consists of a vision system and robotic arms mounted with corers to individually core each head in a grow tray at high speed. The vision software can also be capable of detecting which heads of lettuce might not pass quality control standards, and opt to skip harvesting that head, leaving it in place to be discarded. This real time quality control at the time of harvest, will greatly reduce the amount of human labor necessary later in the packaging process, and will simultaneously increase the quality of the leaves being packaged.

BACKGROUND OF THE DISCLOSURE

In the edible plant-growing industry, there is always a need for more efficient and reliable methods of growing edible plants. Since most of the population is located in urban cities and farming historically needs a lot of land, most farming takes place in rural areas. It is estimated that by the year 2050, close to 80% of the world's population will live in urban areas and the total population of the world will increase by 3 billion people. Such an increase in population, with current farming processes, will no doubt require more land to grow the plants. However, there is an increasing need to grow plants closer to the consumer to reduce costs, both monetary and environmental. As such, an increase in plant production efficiencies will be needed to meet these needs and other needs.

One of the methods being used to obtain these improved efficiencies is through vertical farming. Vertical farming is the practice of producing food in vertically stacked layers. such as in skyscrapers, used warehouses, or shipping containers, quite often in urban areas, closer to a majority of the consumers.

In general, vertical farming uses indoor farming techniques and controlled-environment agriculture (CEA) technology, where all environmental factors can be controlled to increase production. Unlike traditional farming, indoor vertical farming can produce crops year-round, thereby multiplying the productivity of the farm. These indoor facilities utilize artificial control of light, environmental control, such as humidity, temperature, and gases, among others. Some vertical farms use techniques similar to greenhouses, where natural sunlight can be augmented with artificial lighting and metal reflectors, among other techniques. Further, growing plants and food indoors reduces or eliminates conventional plowing, planting, and harvesting by farm machinery, which can be expensive and harm the environment.

Further, since the crops are sold much closer to where they are grown, the transportation costs, both monetary and environmental, are reduced. This reduction in transportation time may result in a significant reduction in spoilage, infestation, and energy. Research has shown that, especially in under developed nations, as much as 30% of harvested crops are wasted due to spoilage and infestation.

Also, the success of crops grown through traditional outdoor farming is always subject to the weather, and issues such as undesirable temperatures or inconsistent rainfall amounts, along with natural disasters such as tornadoes, flooding, wildfires, and severe drought. On the other hand, vertical indoor plant farming provides an entirely controlled environment, and the success and productivity of the vertical farm becomes almost completely independent of inconsistent weather.

Further, traditional farming can be a hazardous occupation with particular risks that often take their toll on the health of human laborers, including exposure to infectious diseases, exposure to toxic chemicals commonly used as pesticides and fungicides, and the severe injuries that can occur when using large industrial farming equipment. Vertical farming, because the environment is strictly controlled and predictable, reduces some of these dangers.

Additionally, vertical farming, used in conjunction with other technologies and socioeconomic practices, could allow cities to expand while remaining largely self-sufficient food wise. This would allow for large urban centers that could grow without destroying considerably larger areas of forest to provide food for their people, while also providing additional employment to these expanding urban centers.

Although agricultural robots or "agbots" currently exist and can be deployed for agricultural purposes, such as harvesting or weed control, there is currently no apparatus, system or method for enhanced vertical farming that incorporates an improved storage, shelving and growing system, configured to allow efficient gravity-based irrigation on a per level basis, gravity-based loading and unloading, along with a shuttle system incorporating novel plant-growing pallets and germination trays, all under the watch of autonomous or near autonomous (such as on-demand) 3D/multispectral cameras mounted on a gyroscopic stabilizer, to obtain clean images and video of the growing plants. Nor is there a system in which these images and video, along with other information, is automatically sent to a database for processing by a central computer in order to gauge each plant's health, pest and/or disease issues, and plant life cycle; in effect, utilizing the plant itself as the sensor to control its surrounding environment. There is also no system that incorporates these functions and allows for a harvest in place system for processing the growing plants. The present disclosure satisfies these needs.

SUMMARY OF THE DISCLOSURE

In general, in order to solve the above-mentioned shortcomings in the vertical farming process, the present disclosure utilizes apparatus, system and methods that incorporate an improved storage rack or shelving system used for optimizing the growing process, along with a shuttle system for autonomous rotation of novel plant-growing pallets to optimize growth and significantly reduce labor. The present disclosure further contemplates novel plant-growing pallets and expanding germination trays, along with one or more high definition 3D/multispectral cameras, to photograph and record the growing plants and the plant life cycle. To obtain the optimal pictures and video, the 3D cameras can be mounted on telescoping gimbals, on camera vehicles on rails, or using flying drones, and the recorded images and video are automatically transmitted to a database for processing to gauge plant health, pest and/or disease issues, and other aspects of the plant life cycle.

The vertical farming system can also check for lighting being evenly distributed, dry spots or wet spots throughout the structure (like puddling on the floor or dry plant sites). The system essentially utilizes the plant itself as the sensor to autonomously control its surrounding environment. Additionally, the system includes capabilities for harvesting the plants in the grow trays in order to reduce the amount of harvesting steps, to eliminate the need for unnecessary transport/labor, and to simplify the quality control systems.

As such, it is an object of the present disclosure to provide an improved shelving system or grow structure, configured with each shelf or level at a slight decline to allow for more efficient gravity-based irrigation and gravity-based loading and unloading of trays and pallets. The water from a reservoir is pumped to the uppermost tray of each level, and the grow tray configuration along with the slight decline (approximately 2 degrees) allows the water to run from the first uppermost tray on that level, through the next tray and to each of the rest of the trays on the same level, due to the gravitational force. Alternatively or in combination with, instead of flowing throughout each level, the water can flow through each column. Once the water reaches the last (and lowest) tray on that particular level, it exits the bottom and is drained back to the reservoir to be recirculated to other trays in the vertical farming system. As such, gravity pulls the pallet or grow tray into position so that just one strategically located lift in the load and unload positions, can load and unload an entire cluster of grow trays. This eliminates the need for a shuttle needing to traverse every level.

It is also an object of the present disclosure to provide an automated lift on the side or end of the structure or shelving unit for both (gravity-based) loading and unloading the trays or plant-growing pallets from the shelves. The present disclosure also contemplates a separate lift (two in total) on both sides of the shelving system, as necessary, and the lift able to travel on a rail along the entire length of the cluster of grow structures. In an embodiment, rollers running the entirety of each level eliminates the need for automation along the whole length of the shelf structure, as the trays or pallets can be loaded and unloaded in a first in/first out order (FIFO), although last in/first out and other loading and unloading protocols are contemplated, depending on the lift system used. In doing so, a single automated lift can load or unload all levels of the structure. The lift ties into a conveyor system that can transport the plant-growing pallets to a number of locations, including facilitating transportation of the trays to the farmer, instead of the other way around. This system will significantly reduce the labor needed on a vertical farm.

Additionally, it is an object of the present disclosure to provide, either alone or in combination with the gravity-based grow structure, a shuttle system for accessing the particular trays or plant-growing pallets. The grow structure system and shuttle system can be built from standard pallet racking, similar to the pushback grow structure, however, in this instance, all the levels in the shuttle system will be horizontal and the grow trays or pallets will be accessed by shuttles. In the preferred embodiment, one shuttle can service an entire grow rack, as the shuttle can be transported between levels by a lift and move across the length of each level. However, the present disclosure further contemplates that multiple shuttles, one on each level, or even multiple shuttles on each level can be used to effectuate access to each tray or pallet. As described herein, all three systems, gravity-based, single-shuttle and multi-shuttle can be incorporated separately or in combination with one or two of the other systems.

In an embodiment the objective of the present disclosure is to use clusters of back-to-back grow racks. In doing so, each cluster consists of two back-to-back grow racks of any length. Each cluster will have one or two lifts, which will be configured to transport a shuttle or the grow tray itself to any level in that cluster, thus enabling the lift to pick any grow tray on any level and then deliver it to a central conveyor belt system, if needed. As such, a shuttle or the grow tray can transport itself from cluster to cluster by way of a ground level rail system that connects to each cluster, and a single shuttle could service every single grow tray position in any cluster on the floor, and deliver that grow tray to the central conveyor system. Additional shuttles can be added to the same infrastructure as the need for throughput increases and the system, as a whole, is scalable.

It is also an object of the present disclosure that the grow trays or pallets will be accessed (for moving or removing) using a forklift, or arms, conveyors, or any other manner as understood by one having ordinary skill in the art. In the preferred embodiment, each shuttle will accommodate a 4 foot×4 foot grow tray, although many other size trays can be used within the scope of the disclosure.

It is yet another object of the present disclosure that the grow trays or plant-growing pallets will be configured to grow produce directly inside the pallet, as well as being configured for easy transportation by forklift (or arms, conveyor, etc.) The plant-growing pallets will be engineered for sanitary purposes by reducing areas where water and impurities can congregate. This unitary, one-piece design will help reduce plant disease and other problems with growing plants in such a structure, possibly thermoformed.

Additionally, it is another object of the present disclosure that each grow tray can be configured with a cover with multiple holes that will allow the plant to grow through the holes and the top of the cover will be reflective to optimize the amount of light that is provided to the plants. As such, the configuration will reflect light from the source to the underside of the plants that might not receive as much light. This will increase the effectiveness of the light source. The grow tray configuration also includes inlet and outlet ports or holes to allow water to cascade from one tray's outlet port to the adjacent tray's inlet port. This configuration allows for complete irrigation by filling the highest tray with water and letting the water move (through gravity) from one tray to the next until it reached the lowest tray, where the water can be removed and recirculated as necessary. This tray design eliminates the need for a water supply line to every grow tray, increases the levels of dissolved oxygen in the water to enhance plant growth, and eliminates the need for bell siphons.

Another aspect of the present invention includes expanding germination trays comprising a tray similar to the currently used trays, to propagate seeds in, but configured with joints and hinges to expand to the proper spacing necessary for mature plants to grow properly and without the normal shock the plants receive upon replanting. The present disclosure, describes a system with only a few plant sites, but a typical plant-grow tray may have anywhere from 10-150 plant sites.

It is yet another object of the present disclosure that the grow trays or plant-growing pallets will be configured such that the inside of the tray or pallet may have ridges to assist in directing the water to all internal areas in the grow tray, so that each plant site will be exposed to and receive water. The plant-growing pallets will also contain strategically located holes to allow for proper draining, as described above, and for emptying into the adjacent grow tray. The floor of the grow tray may be slightly inclined, preferably 1 to 5 degrees, to assist and allow water to flow from one side of the tray to the other, and may further include a bell siphon, or similar device, which will be located over the drain hole to allow the grow tray to fill to a certain water level before draining out.

Another object of the present disclosure is a novel water supply and draining system. In an alternative embodiment not using the adjacent tray draining system, any number of grow trays can sit on top of a level of rollers, with the grow trays jutting out slightly on either end of the rollers. Under the rollers, and spanning the entire length of the level, and having a width larger than the tray itself, is a trough style drain. The purpose of this trough drain is so that the water supply can feed directly into the grow tray and then drain out of the opposite end of the grow tray into the trough drain. If a pallet is absent from its position, i.e., it has been unloaded, the water supply will still feed directly into the trough drain and recirculate back into the systems nutrient reservoir. The trough will be wider than the rollers so that any water being supplied or drained does not make any contact with the rollers.

Additionally, the rollers will be positioned at an angle towards the drain, so that supplied water will be pulled by gravity towards the grow tray's drain hole. The rollers will also be angled towards the grow rack's lift, keeping in line with the gravity pulled system. By having these two angles or slants, the water is forced by gravity towards the drain, while the grow tray is forced by gravity towards its unloading location.

Another object of the present disclosure is to provide a novel lighting system. Depending on the particular crop, the distance from the light source to the plant canopy can improve the growth of the plant. Historically, vertical farmers would need to build an entire grow rack to the particular distance specification for the crop being contemplated, and would mount the LED bars directly to a unistrut, or another fixed location, in the pallet racking. Once the grow rack is built, it is difficult to adjust the distance of the light to the plant canopy without disassembling the entire rack. Instead, in an embodiment, the LED lighting bars are configured to be moved for different heights for different crops. A wire level can hook directly into the pallet racking holes, and the LED lighting bars would be attached. In this manner, if the lighting bars needed to be adjusted to change the distance from the LED lights to the plant canopy, the wire level is unhooked and moved to the desired height, without disassembling the entire section thereby allowing farmers to adjust the distance of the light to the plant canopy on demand, either manually or automatically (the wire level could be attached to rods and gears to be moved automatically based on the plant's maturity)

It is yet another object of the present disclosure to provide an automated lighting system in which lighting bars are integrated into a lighting platform. The lighting platform is connected to the shelving system, but can be raised and lowered independently above the grow trays and plants using a motor, precise enough to provide feedback to the vertical farming system about the distance the lighting bars are from the growing plants throughout the life of each plant. A history is generated, and incorporated with information from sensors in the grow trays or integrated into the vertical farming system itself, to be included in a database of all of the similar plants for optimizing the growth of the plants. Lighting platforms in the same system can be controlled separately so that each tray/pallet receives the optimal light spacing and light intensity for the cultivar that is growing in it. This allows multiple crops to be grown in the same structure, each in their own optimized environment.

It is yet another object of the present disclosure, in addition to creating an optimal plant-growing environment in which the plant is the main sensor and provides feedback to the system to optimize growing performance, to utilize the automated lighting platform to reduce both labor and energy costs and thus generate labor and energy cost savings. As described above, based on the plant canopy's height at any point in the plant's life cycle, the lighting platform is configured to autonomously adjust the lighting fixture height above the crops to maintain a constant, optimal position throughout crop growth cycle, thereby eliminating the need for daily, manual adjustments. These continuous adjustments allow the lighting fixtures to be positioned at a minimum distance from the crops throughout the growth cycle. Maintaining the lighting fixtures at a minimal height above crops allows for the utilization of less powerful (i.e., lower wattage) lighting fixtures (or standard-power lighting fixtures at lower power consumption rates through dimming schema). Additionally and as described herein, the novel tray design may include reflective covers to reflect the lighting to the underside of the plant thereby increasing the effectiveness of the lighting element and reducing the need for more power. Maintaining this minimum light fixture height (along with the reflective cover) autonomously produces the required light intensity needed for plants to grow efficiently at a reduced, and sometimes greatly reduced wattage, therefore reducing the cost. This resolves one of the major expenses in the vertical farm industry: high power consumption.

It is yet another object of the present disclosure to provide a camera system for taking photographs and video of the growing plants at each stage of development. As described herein, these cameras can be incorporated into the vertical farming system in a number of ways, including through either one or more of high definition cameras located on telescoping poles; using a camera vehicle that houses one or more cameras and is attached to a rail or rail system; and autonomous flying drones, flying preprogrammed routes. Each of these systems will greatly reduce or eliminate certain labor costs such as monitoring the plants for disease and care purposes. One or more cameras can also be permanently mounted onto the vertical farming system in strategic places.

The system can incorporate high definition cameras to record the life cycle of the plants. These types of cameras provide high-resolution images and video of the growing plants. Cameras can utilize physical filters (e.g., low-pass, high-pass, band-pass) to highlight vegetation (or the absence of) within an image. Additionally, digital image filtering and manipulation (i.e. digital image analysis; digital image processing; computer vision) facilitate the real-time identification of individual plants (or tray canopies) in order to track and quantify plant growth, plant growth rate and biotic and abiotic stress. Digital image processing may include one or more of the following techniques: thresholding (static and variable), erosion, dilation, color space manipulation, image channel manipulation and pixel value normalization and transformation schema. Digital filters and digital image manipulation improve and expedite contour detection, contour centers calculations, image histogram analysis, comparisons, and correlation between pixel (i.e. digital) representation and actual crop canopy area (i.e. physical units). Real-time quantification of plant canopy areas (and temporal changes in plant canopy areas) are used to autonomously adjust light intensity and/or photoperiod to maintain optimum light quantity throughout the growth cycle; as well as to compare growth rates with established crop models (i.e. historical data) to gauge plant health and vigor. Early detection of plant stress (and elimination/alleviation of it) is fundamental to the consistent production of high value crops. Therefore, in addition to autonomously modifying environmental conditions (e.g. light intensity, photoperiod, air speed, air temperature, water temperature, humidity) upon detection and identification of a plant/crop abnormality, the system also transmits and logs an alert to operators.

Each of these systems will greatly reduce or eliminate certain labor costs such as monitoring the plants for disease and care purpose.

It is yet another object of the present disclosure to provide autonomous flying smart drones that land on charging mats or bases, when not in use for charging purposes, and follow a preprogrammed flight pattern (usually at night, but can be scheduled or on demand) to obtain images and video (and possibly infrared images, among others) of the growing plants and the grow structure (i.e., system) itself. These recorded images and video, along with other information, such as temperature and humidity at particular times and locations, is automatically sent to a computer database for processing in order to gauge the health of the system as a whole along with each plant's health, pest and/or disease issues, and plant life cycle. The system can also check for lighting being evenly distributed, dry spots or wet spots throughout the structure (like puddling on the floor or dry plant sites). This system will therefore allow itself to automatically "flag" any potential issues for a human to review.

It is yet another object of the present disclosure to provide a novel rack structure manufacturing system in which the rack is made up of predesigned structure, such as extruded aluminum or extruded plastic, and uses hollow cavities for transporting water, electricity, cool and warm air and humidity from one location on the rack structure to one or more locations on the rack structure, without the need for separate conduit, ducts or connections. The rack structure system of the present disclosure can be designed to be originally built, or later enlarged, without the need for designing (or redesigning) separate conduit for transporting items necessary for the plant-growing cycle. As the rack system is built, or later enlarged, each rack system component connects with the other components, using the predesigned hollow cavities to create the necessary conduit, ducts or connections. This will allow the entire grow structure to function as large, simple appliance, with one input for electricity, one input for water, and one input for air, as well as other built-in mounting points and rails for camera systems. This will significantly reduce the cost and complexity of existing vertical structure designs.

It is yet another object of the present disclosure to provide a novel harvesting system, either a harvesting press or an articulating harvester, in which the plants are harvested in their plant grow trays. Instead of the manual harvesting process, the present disclosure relates to a harvest in place process or system. The harvesting press uses multiple corers strategically mounted in a mirror image of the plant sites in the grow tray. The corers could vary in diameter based on the particular crop being harvested and might also spin, to make the coring process simpler. The harvesting press would drop down in a single motion against the grow tray, simultaneously coring all of the plant sites, resulting in the cores remaining in their sites, and the loose leaves separated on the tray. The leaves can then be removed in a number of different ways for additional processing or packaging. The articulating harvester, on the other hand, consists of a vision system and robotic arms mounted with corers to individually core each head in a grow tray at high speed, removing the leaves for processing and/or packaging. As described herein, the vision software can also be capable of detecting which heads of lettuce might not pass quality control, and opt to skip harvesting that particular head, leaving it in place to be discarded, and potentially reducing the amount of human labor necessary at a later time in the packaging process, while increasing the quality of the leaves being packaged.

These and other aspects, features, and advantages of the present disclosure will become more readily apparent from the attached drawings and the detailed description of the preferred embodiments, which follow.

BRIEF DESCRIPTION OF THE DRAWINGS

The preferred embodiments of the disclosure will be described in conjunction with the appended drawings provided to illustrate and not to the limit the disclosure, where like designations denote like elements, and in which:

FIG. 4 illustrates a prior art plastic pallet used transportation and storage of boxes and the like;

FIGS. 5A-5C illustrate an improved plant grow tray for vertical farming systems in accordance with one embodiment of the present disclosure;

FIGS. 6A-6C illustrate an improved expanding plant germination tray and cutting apparatus for vertical farming systems in accordance with one embodiment of the present disclosure;

FIGS. 7A-7D illustrate camera systems used for accessing inaccessible locations and taking images and video of objects at those locations;

DETAILED DESCRIPTION

Figure 1:
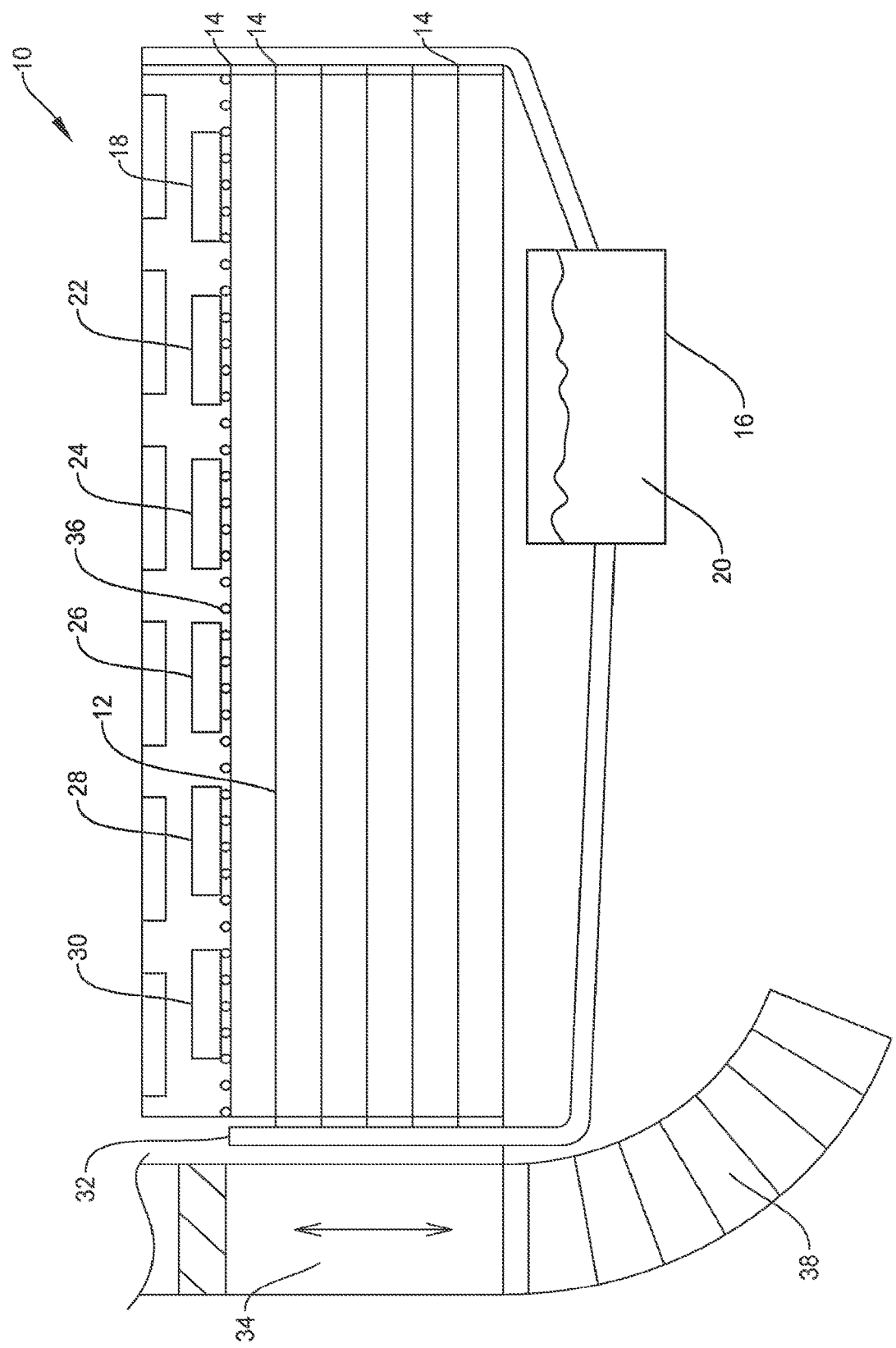
FIG. 1 illustrates an improved vertical farming system comprising a pushback grow structure in accordance with one embodiment of the present disclosure.

Referring to the drawings, wherein like reference numerals refer to the same or similar features in the various views, the present disclosure pertains to an improved vertical farming system for autonomously growing edible plants, using improved stacking, storage and shelving units are configured to allow for easy access and gravity-based irrigation and feeding, alone or in combination with an improved shuttle system for autonomous rotation of the growing plants throughout the improved vertical farming system.

The innovative vertical farming system further comprises novel grow trays or plant-growing pallets, and incorporates camera systems, including telescoping arms, camera vehicles and autonomous smart drones, fly preprogrammed routes; all with 3D and multispectral cameras (and other recording instruments) to photograph and record the growing plants and obtain vertical farming metrics, as necessary. The images and other data recorded being automatically sent to a database for processing and for gauging plant health, pest and/or disease issues, and plant life cycle. The system can also check for lighting being evenly distributed, dry spots or wet spots throughout the structure (like puddling on the floor or dry plant sites).

The innovative vertical farming system also comprises autonomous or nearly autonomous harvesting systems for harvesting plants in the grow trays. The harvesting systems disclosed include articulating harvesters that can autonomously determine the location or center of the plant to be harvested and use telescoping arms to move the harvester into the proper location before harvesting the plant. Alternatively, a harvest press uses a device sized similar to the grow tray for harvesting all of the plants in the tray at once in a single motion. The harvested material can be packaged for consumption or other use, and the remaining cores (in tray) can be discarded or further processed.

FIG. 1 shows an improved vertical farming system 10 comprising a shelving system or pushback grow structure 12, configured with multiple shelves or levels 14, each shelf or level 14 at a slight decline to allow for more efficient gravity-based irrigation and gravity-based loading and unloading. In the preferred embodiment, the shelf 14 decline angle is between 1 and 5 degrees and preferably 2 degrees, however, other angles can be used for the same purpose. The pushback grow structure 12 can be any length from a few feet to a thousand feet long, and based on the description herein, the only limitation on the height of the structure 12 is the height of the building (not shown).

In practice, water or a nutrient solution 20 (for ease of reference, we will refer to water, but the present disclosure contemplates any solution that can be transported throughout the system) from a reservoir 16 is pumped to the uppermost tray of each level (here shown as 18 in the upper level), and the slight 1 to 5-degree decline allows the water 20 to run from the first uppermost tray 18 on that level 14, through the rest of the trays 22-30 (as examples) on the same level 14, due to the gravitational force, or down each column as described above. Once the water reaches the last (and lowest) tray 30 on that particular level 14, it exits the bottom 32 and is drained back to the reservoir 16 to be recirculated to other trays on the pushback grow structure 12.

FIG. 1 also shows an automated lift structure or lift 34 on the side of the pushback grow structure or shelving unit 12 for both loading and unloading the trays or plant-growing pallets 18 and 22-30 from the shelves 14. Rollers 36 running the entirety of each level 14 reduce the need for automation along the whole length of the shelf structure 12, as it is a "push back" loading system and the trays or pallets 18 and 22-30 can be loaded and unloaded, with a gravitational assistance, in a first in/first out order (although other loading and unloading protocols are contemplated). In doing so, a single automated lift 34, which can traverse between the different levels 14, can load and unload all levels 14 of the structure 12. The lift 34 ties into a conveyor system 38 that can transport the grow trays or plant-growing pallets 18 and 22-30. In the preferred embodiment, gravity pulls the pallet or grow tray 18 and 22-30 into position so that just one or two lifts 34 can load and unload an entire level 14.

The preferred embodiment comprises two lifts 34 per shelving system 12, regardless of the number of shelves 14. This eliminates the need for a separate lift structure 34 on every level. As one grow tray 18 is removed form a shelf 14, gravity and the slant or decline of the shelf 14 moves the next grow tray 18 into the location left vacant by the removed grow tray 18. Additionally, after removal of a grow tray 30 on a shelf 14, the remaining grow trays 18 22-28 on that shelf 14 move over one place due to gravity and the rollers 36.

Figure 2:
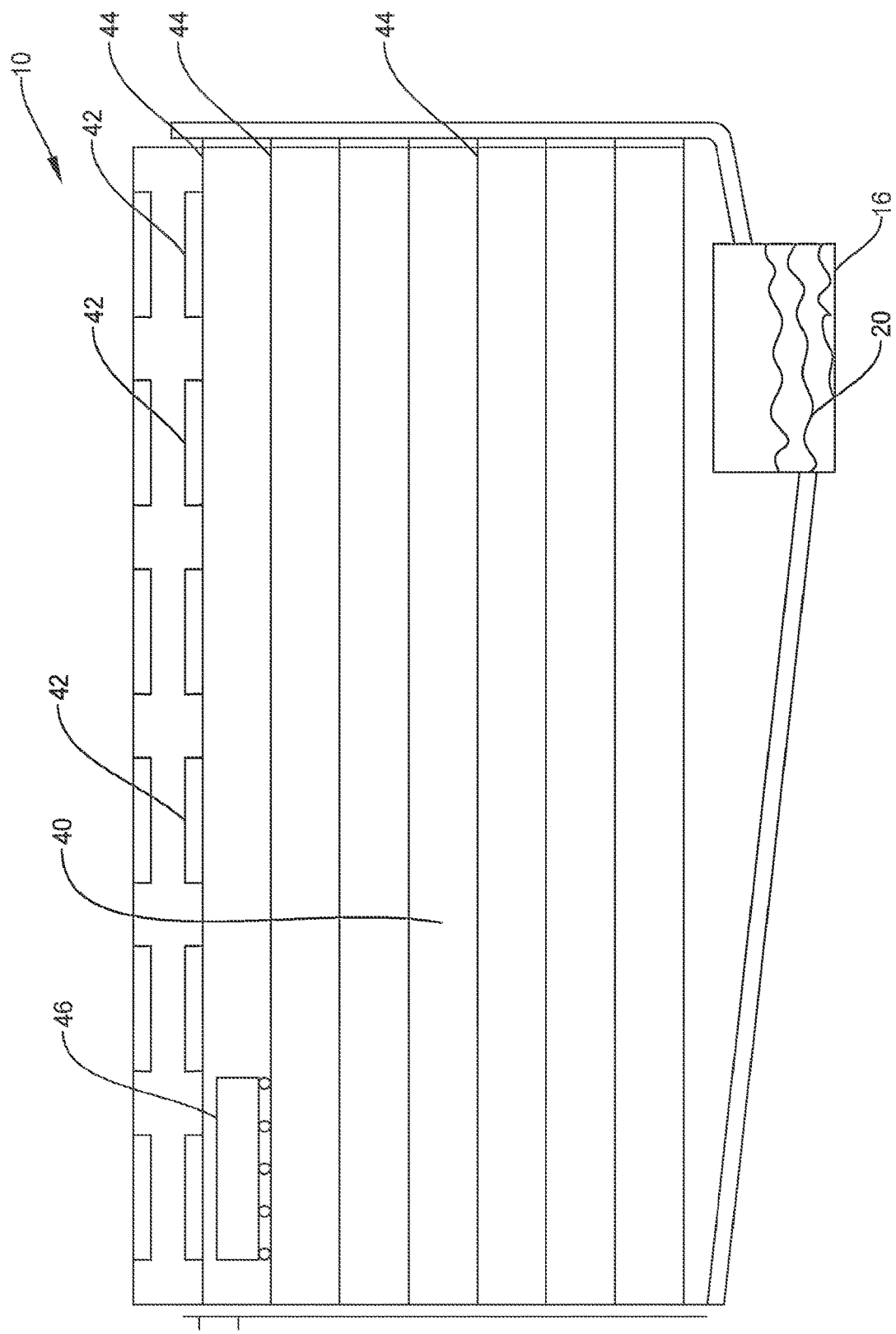
FIG. 2 illustrates an improved vertical farming system comprising a shuttle structure in accordance with one embodiment of the present disclosure.

FIG. 2 shows an improved vertical farming system 10 comprising a shuttle system 40 for accessing the particular trays or plant-growing pallets 42. The shuttle system 40, which is used for autonomous rotation of the crops, can be used either alone or in combination with the pushback grow structure 12. Although shuttle systems 40 with multi-level scalability currently exist, such as the one distributed by Invata Intralogistics, the novel system may comprise, at a minimum, combining the pushback grow structure 12 with a multi-level shuttle system to improve the plant growth process. As such, the vertical farming system 10 can see improvements incorporating an irrigation system using the reservoir 16 with slightly sloped levels 14 (FIG. 1), alongside the shuttle system 40.

Likewise, the pushback grow structure 12 and the shuttle system 40 can be built from standard pallet racking materials and designs. However, if the shuttle system is used without the grow structure 12, all the levels 44 will be horizontal (no slope) and the plant-growing pallets 42 will be accessed by shuttles 46. In the preferred embodiment, one shuttle 46 can access an entire grow rack level 44. If the shuttle 46 is transported between levels 44 by a lift (not shown), it can then move across the length of each level 44. The present disclosure contemplates that multiple shuttles 46, one on each level 44, or even multiple shuttles 46 on each level 44 can be used to access to each tray or pallet 42.

The present disclosure further comprises a shuttle system 40 in which the plant-growing pallets 42 will be accessed (for moving or removing) by the shuttle 46 using a forklift, or arms, or any other manner as understood by one having ordinary skill in the art (not shown). In an embodiment, each shuttle will be able to access and move or remove a 4 foot×4 foot plant-growing pallet 42, although other size trays 42 can be used to obtain the same results. In practice, the shuttle 46 will be moved into a proper location to access the pallet 42. A forklift or arms will grasp the pallet 42, either from underneath or from the side, and remove the pallet 42 from the location. Once the shuttle 46 has secured the pallet 42, the system will instruct the shuttle 46 as to where that particular pallet 42 must be moved to (or removed) from the level 44 for further processing. Similar to the pushback grow structure 12, the shuttle system 40 can be used in conjunction with a conveyor system 38, as shown in FIG. 1.

Figure 3:
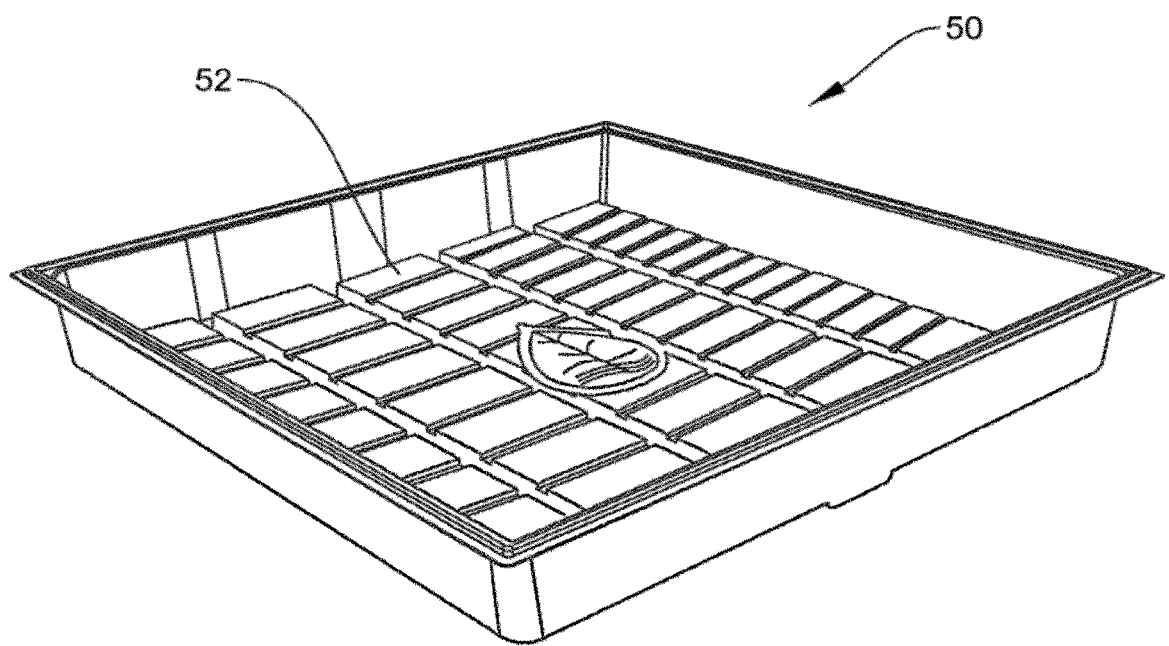
FIG. 3 illustrates a prior art plant grow tray used in vertical farming systems and methods.

FIGS. 3, 4 and 5A through 5C show various grow trays 18 and/or plant-growing pallets 42. FIG. 3 shows a prior art plant grow tray 50, such as that distributed by Botanicare. The tray is 4 feet by 4 feet and made from thick ABS plastic, with a smooth plastic surface and large drain channels 52.

Figure 4:
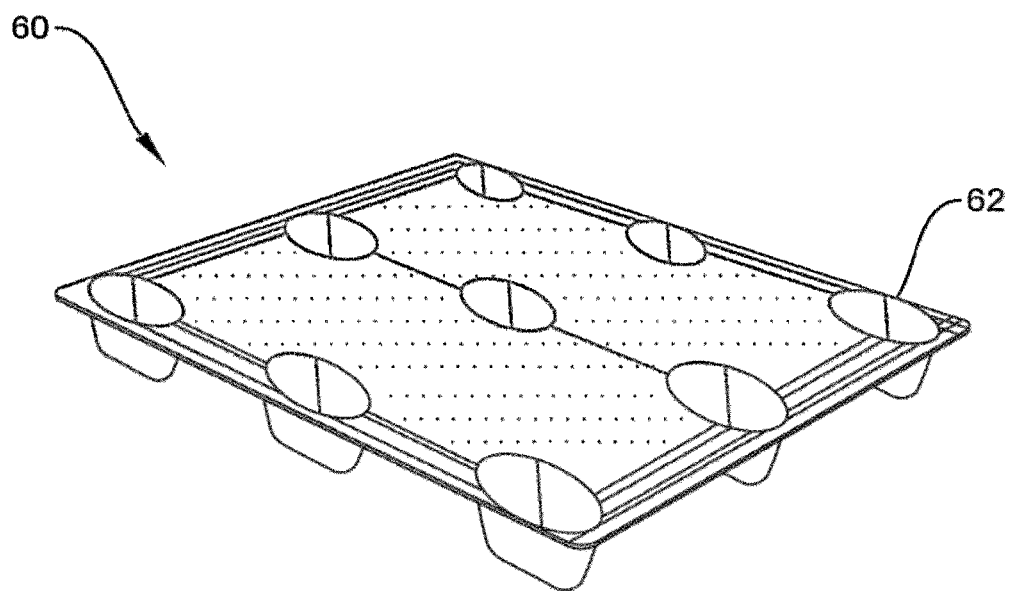

FIG. 4 shows a prior art Economy Plastic Pallet 60, but not for growing plants. The plastic pallet is distributed by Uline Industries and is configured to stack on top of one another for easy storage when not in use. The pallet 60 has nine legs 62 and provides access for a forklift from all four sides. The 9 legs 62 provide additional support and the pallets 60 are either 48 inches by 40 inches, or 48 inches by 42 inches.

FIGS. 5A through 5C show the present disclosure of a grow trays or plant-growing pallets 70 configured to grow produce directly inside the pallet 70. Similar to the 9-legged pallet 60, the plant-growing pallet 70 provides a stable tray for placing on the pushback grow structure 12 or the shuttle system 40. The plant-growing pallet 70 is configured for easy access and transportation by a forklift, robotic arms, etc. and the plant-growing pallet 70 can be configured for 4, 9 or any other number of legs (to hold the plants, or to hold a tray that is holding the plants). The grow tray 70 may also have a smooth bottom with no legs, and be slanted on the bottom to better accommodate the slanting or declining shelf 14 or to facilitate the transport of water 20 for better irrigation purposes.

FIG. 5A shows a side view of the plant-growing pallet 70, showing two of the four legs 72. The lift 34 can access the plant-growing pallet 70 from any one of four directions. FIG. 5B shows a top view of the plant-growing pallet 70 with the four legs 72. FIG. 5C shows a top view of the floor of the plant-growing pallet 70, with ridges 74 and a drain hole 76. The tray may be sloped (again 1 to 5 degrees) to allow the water to move to the drain hole 76. A bell siphon or similar device may be used to ensure that water levels do not overflow from the grow trays.

The plant-growing pallets will be engineered for sanitary purposes by reducing areas where water and impurities can congregate. This unitary, one-piece design will help reduce plant disease and other problems with growing plants in such a structure, possibly manufactured through a thermoform process.

FIGS. 5D through 5G show the preferred embodiment grow trays or plant-growing pallets 200 configured to grow produce directly inside the grow tray 200. The disclosure may reference grow tray 70 or grow tray 200, although each of the novel grow trays disclosed herein can be used in the improved vertical farming system 10 disclosed herein, and can be used interchangeably with other grow trays or plant-growing pallets disclosed herein and referred to as 18, 22-30, 42, 70, 80, 200.

Figure 5D:
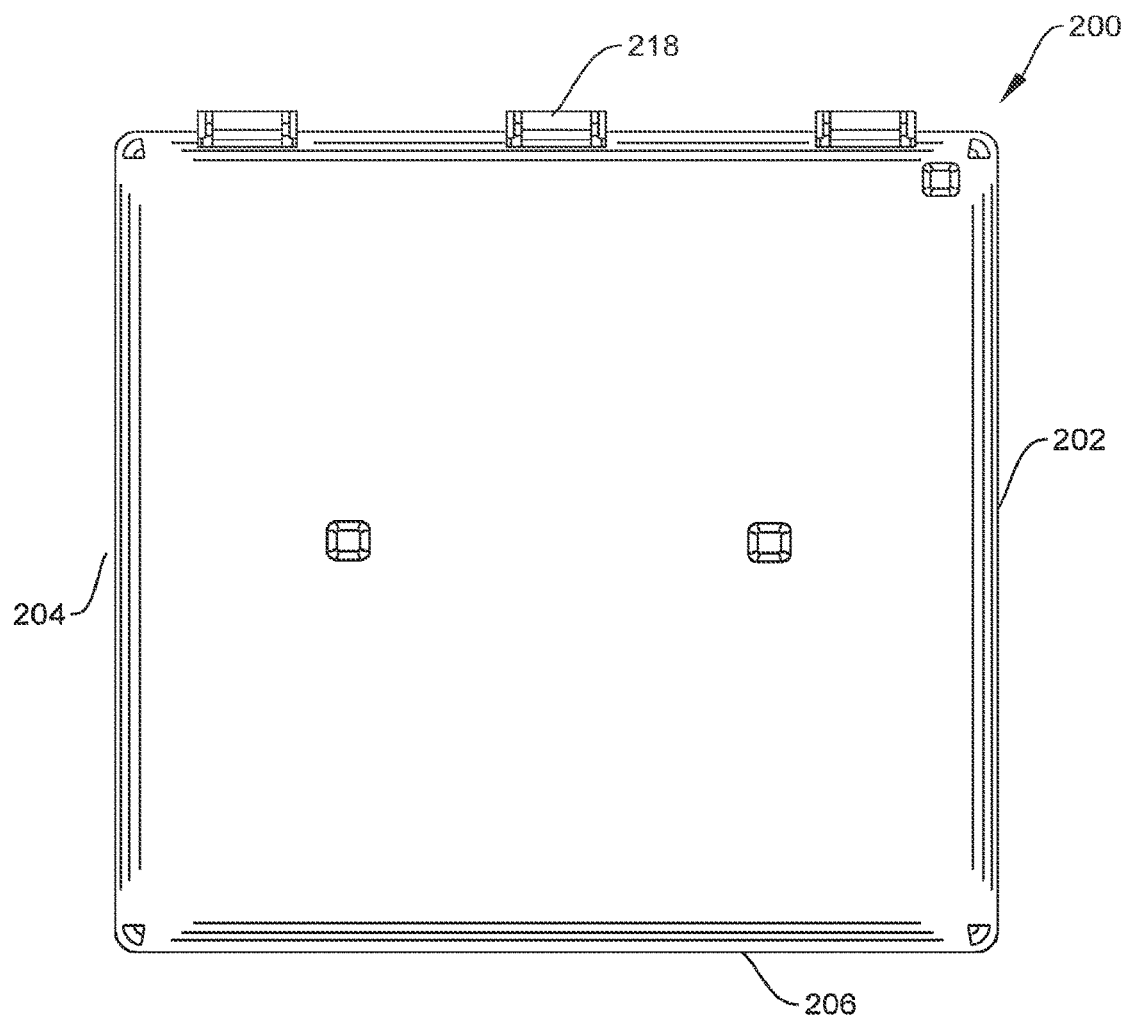
FIGS. 5D-5G illustrate an improved plant grow tray for vertical farming systems in accordance with one embodiment of the present disclosure.
Figure 5E:
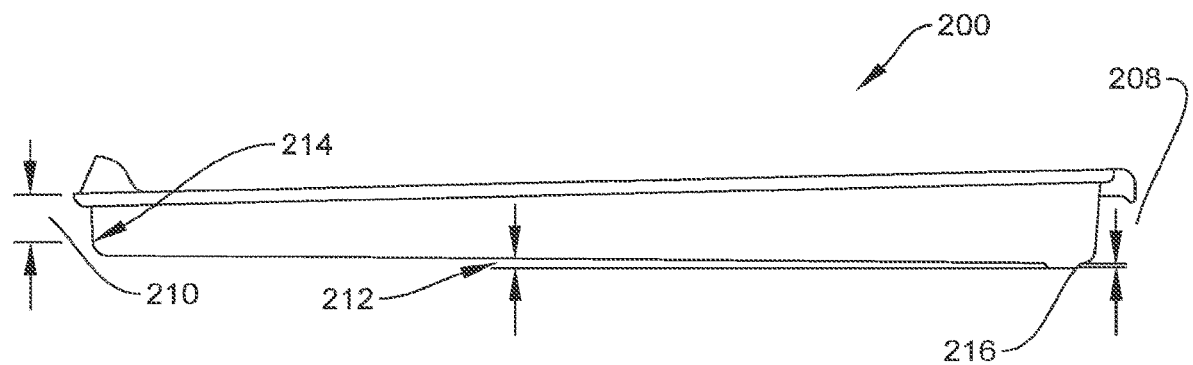

Similar to the description above, FIGS. 5D and 5E show a top view and side view of the grow tray 200 respectively, with the bottom of the grow tray 202 shown, where the water and nutrients will be placed to water and feed the plants. In the preferred embodiment, the grow tray is 48.80 inches long 204 by 48.69 inches wide 206, and is tapered with a 4.7 inch height at the tall end 208, and a 2.47 inch height at the short end 210, providing for a 2 degree slant 212 from one side 214 to the other 216.

At the tall end 208 of the grow tray 200, there are one or more ports 218 to allow water to cascade from one tray 200 to the adjacent tray 200 on the shelf. In FIG. 5D there are three ports 218. Thus, due to the angle of the vertical farming system shelves, when the grow trays 200 are placed next to each other on the shelf, water can be poured into the highest tray 200 and once it reaches the port 218 level 220 of the grow tray 200, water will cascade out through the port 218 and into the adjacent tray 200. In the example shown in FIG. 5D, each of the three ports 218 tapers from 5.44 inches to 5.00 inches to direct the water into the next tray 200.

Figure 5F:
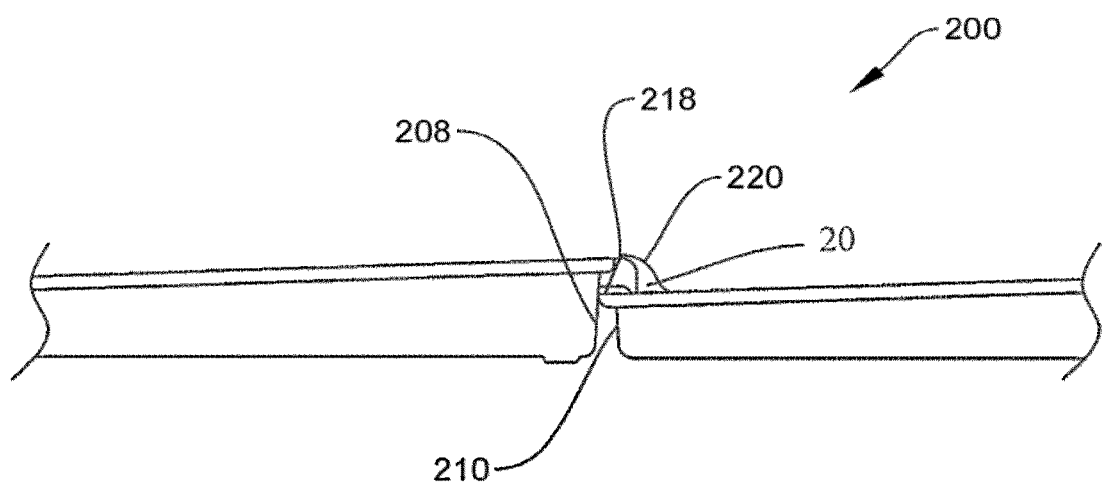

FIG. 5F shows two grow trays 200 adjacent each other, such that the tall end 208 of one tray 200 is above the short end 210 of the adjacent tray 200. In this configuration, water 20 can be seen exiting the port 218 and entering the short end 210 of the adjacent tray 200. This will be repeated when each tray fills with water 20 to the level of the port 218 and pours into the adjacent tray 200.

Figure 5G:
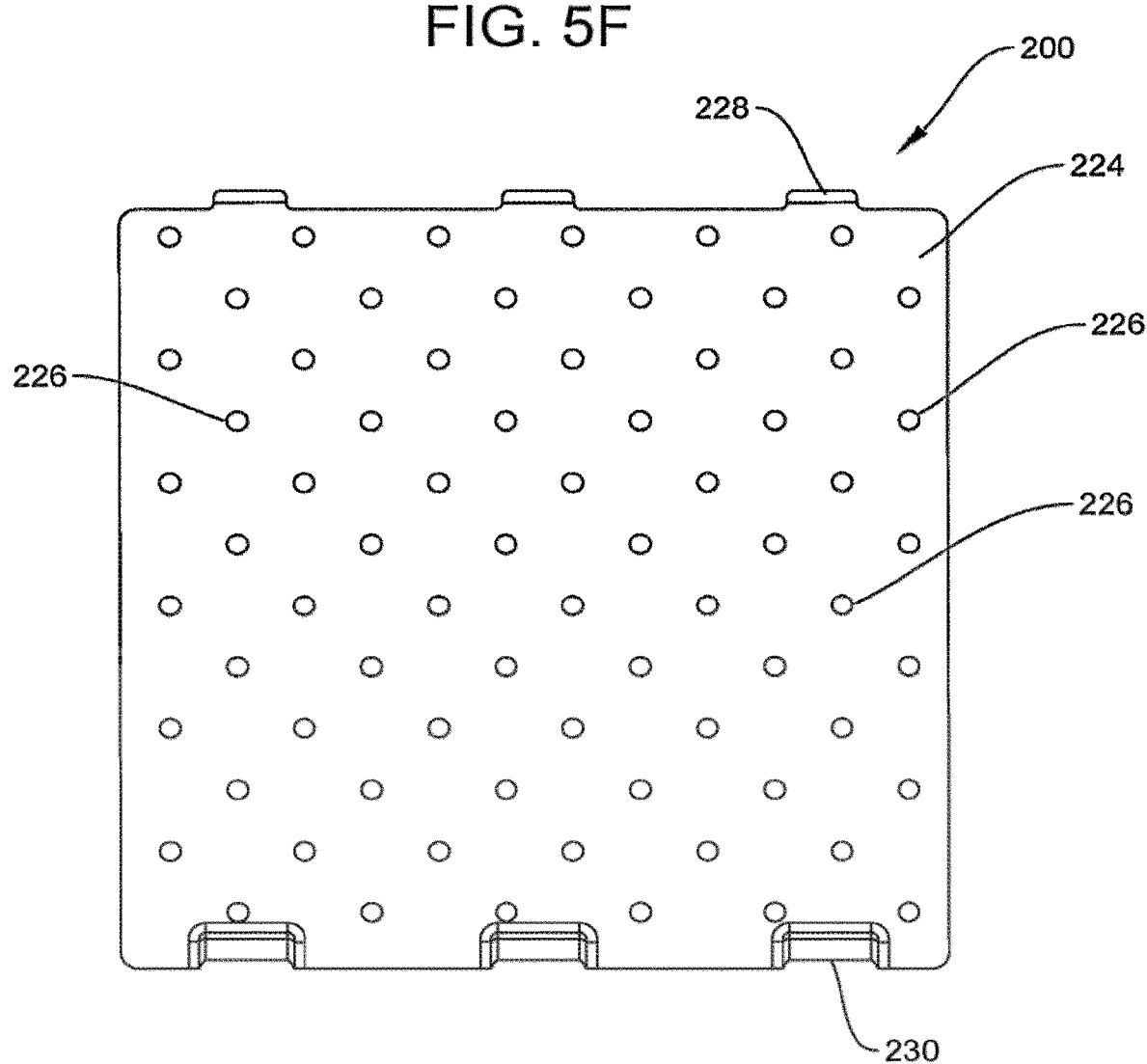

FIG. 5G shows a cover 224 for the novel grow tray 200. The cover 224 has multiple holes 226 for growing the plants (through the holes 226). In the example shown in FIG. 5G, there are 72 different holes 226 for growing plants, although more or less plants can be grown depending on the configuration, which may be due to the type of plant.

The grow tray cover 224 also contains port cover portions 228 for covering the ports 218 and reducing spillage. The grow tray cover 224 also contains cover indents 230 where the ports 218 from the adjacent tray 200 will connect to make sure the overflow water 20 from the adjacent tray 200 is properly received. When the last tray 200 on the shelf fills with water, the overflow will pour into a gutter or reservoir 16, where it can be either disposed of or reused. This system and the novel grow tray 200 allows for irrigating multiple trays and many plants merely by pouring water into the highest tray 200 at the height of the shelf 14, and collecting the water 20 as it pours out of the ports 218 of the lowest tray 200 at the short end 210 of that tray 200.

FIGS. 6A through 6C show the present disclosure and the related novel expanding seed germination tray 80 of the vertical farming system 10, configured to grow produce directly inside each cell section 82 of the germination tray 80 for a longer period of time, without the need to replant the seeds into a different cell section 82 for additional room. The expanding germination tray 80 is meant to reduce the amount of "shock" that a plant's root system goes through every time the root system is moved or replanted. The germination tray 80 can also be used in combination or conjunction with the grow tray 200 design disclosed herein.

Typically, a Rockwool tray is inserted into a propagation tray where the seeds will germinate. Other types include cocoa coir, and other grow media. Then, the Rockwool tray is separated into parts and transplanted into a Styrofoam raft, which has more appropriate spacing for mature plants.

FIGS. 6A and 6B of the present disclosure show an expanding germination tray 80 comprising a tray similar to the currently used trays (FIG. 6A), to propagate seeds in, but configured with joints 84 and hinges 86 to expand (FIG. 6B) to the proper spacing necessary for mature plants to grow properly and without the normal shock the plants receive upon replanting.

Additionally, FIG. 6C shows an expanding germination tray cutting die apparatus 88 for creating the novel expanding germination tray 80. As understood by one having ordinary skill in the art, the cutting die apparatus 88 is a near identical size to the expanding tray 80, but utilizes razor edges to assist in cutting the Rockwool expanding trays 80 into parts before expanding. Further, the cutting die apparatus 88 may be used to just cut the Rockwool into sections so that the tray easily expands.

The improved vertical farming system 10 further comprises a camera system or systems to photograph, take video, record and monitor the plants during the entire plant life cycle. FIGS. 7A through 7D show the different types of camera systems in accordance with the present disclosure. Since farms, including vertical farms, rely on either human beings or multiple cameras to monitor crops, the novel solution described herein allows the use of a single camera to monitor and analyze many plants on different levels and even in different areas of the vertical farming system.

FIG. 7A shows a telescoping camera system 240 in which the camera 242 is located at the end of a telescoping arm 244, and utilizes a gimbal system 246 to move the camera to the desired location. The lifts 34 described herein that load and unload grow pallets 200 from the shelving system or grow structure system 12, already are configured to traverse each shelf or level 14, including moving from one group of shelves 14 to another. The camera system 240 utilizes those existing lifts 34 in the monitoring and recording system by moving the camera system 240 from shelf 14 to different shelf 14. Programming the lifts 34 to traverse every load and unload position (while not actually loading or unloading a grow pallet 200) and extending the telescoping arm 244 into the shelf 14 and above the plant canopy, the camera 242 can then record and analyze each and every plant on the particular level 14. In doing so, the information recorded can flag any potential issues.

By travelling to every load and/or unload position, remaining on the lift 34, and inserting the telescoping arm 244 into each level, one lift 34 and one camera 242 can monitor, photograph and/or video every grow tray 200 position on the level 14. Since the telescoping arm 244 can be used from both sides of the shelf (load and unload), the telescoping arm 244 need only travel half of the length of the shelf or level 14, which in turn can minimize cost and maximize the speed of vision analysis. This camera system 240 and the accompanying vision analysis software allows the vertical farming system 10 to analyze the maximum number of plants with a minimum number of cameras 242, saving a significant amount of cost, and also greatly simplifying the system.

Figure 7B:
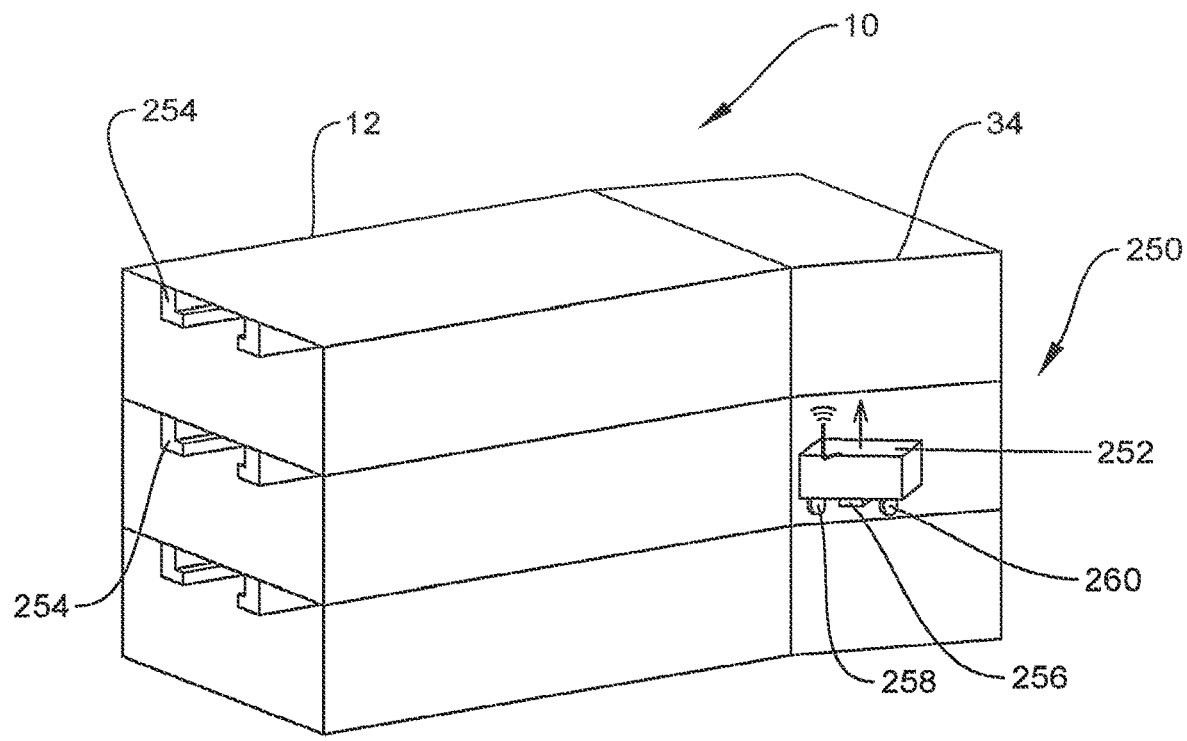
Figure 7C:
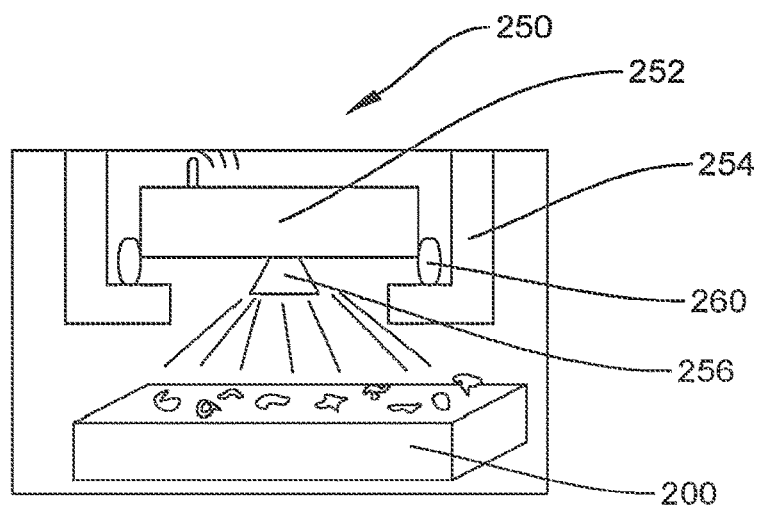

FIGS. 7B and 7C show a different type of camera system, the autonomous vehicle camera system 250 in which an autonomous vehicle 252 can be loaded and unloaded onto rails 254 above the grow trays 200 to travel the distance of the shelf 14 and take pictures or video using an in-vehicle camera 256. The vehicle 252 can travel by the use of one or more powered wheels 258 along with passive wheels 260 in multiple configurations, to move along the rail 254 (above or below). Additionally, the system 250 can be designed to use a single rail 254 and the vehicle 252 can hang from the rail 254, in an example.

Further, similar to the telescoping camera system 240, the vehicle camera system 250 can use the existing lift system 34, but the autonomous vehicle 252 can instead be loaded and unloaded onto each rail 254. As such, the vehicle camera system 250 can be loaded onto the rail 254 of one level, where it will travel above the shelf 14, and take photographs and video, and then be loaded back onto the lift 34, where it will be raised or lowered to another level 14, and loaded onto the rail 254 of that level, for more recording and monitoring. The vehicle camera system 250 can be wirelessly connected to the vertical farming system 10 so that any information obtained can be transmitted to the database 96 (FIG. 8) in real time.

Figure 7D:
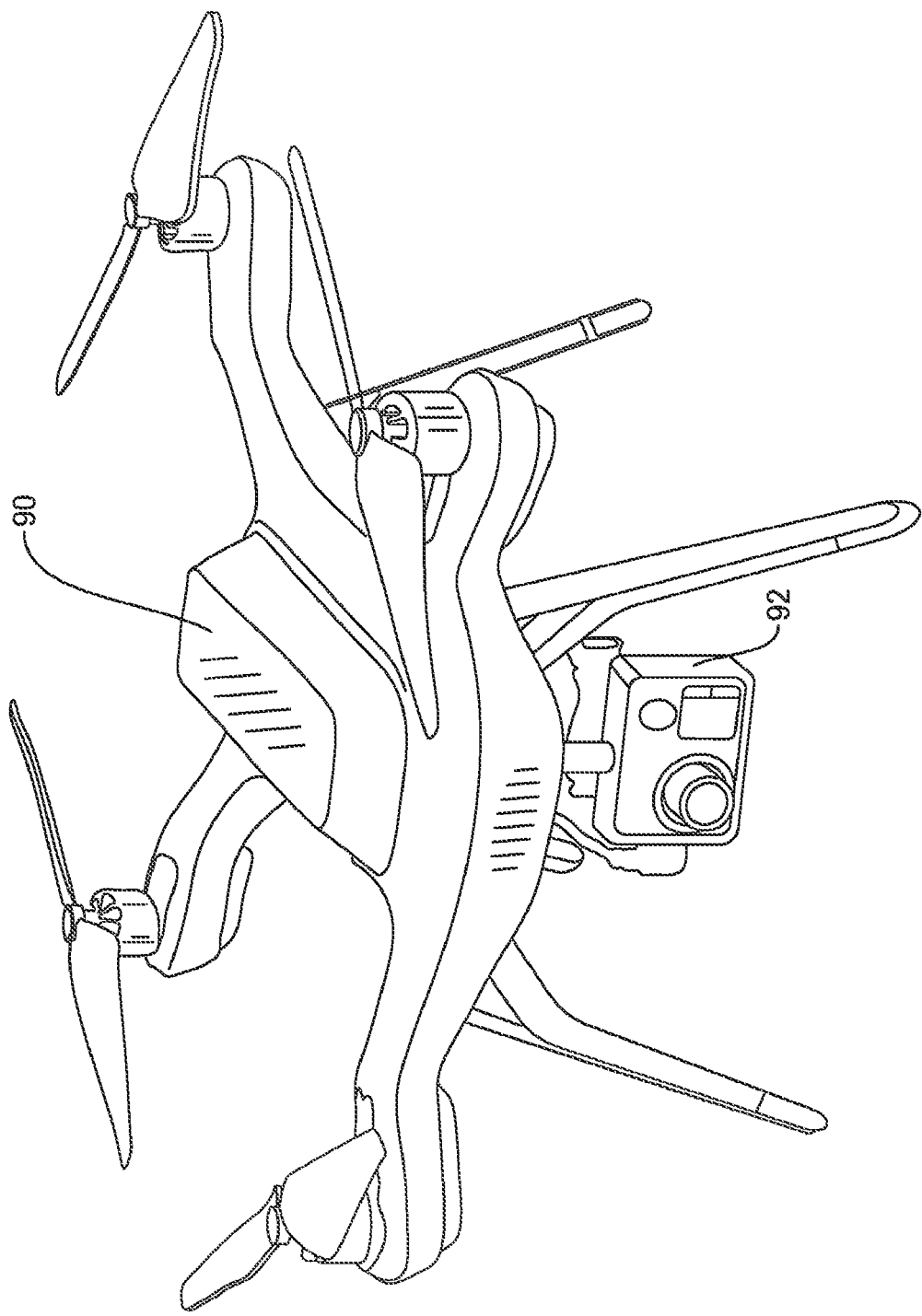

FIG. 7D shows yet another example of recording and monitoring the plant life cycle, using an autonomous flying smart drone 90 for flying preprogrammed routes at preset times or on demand. The flying smart drone 90 incorporate one or more cameras 92, such as a 3D or multispectral camera. As described herein, these types of cameras provide high-resolution images and video of the growing plants and can also be incorporated into the camera system 240 and/or vehicle camera system 250 disclosed herein. For stability purposes, the cameras are mounted on a gyroscopic stabilizer, however, it is contemplated that the flying smart drone 90 will be able to photograph every plant in the vertical farming system 10 environment.

The autonomous flying smart drones 90 are also programmed to land on and connect to their charging mats or bases (not shown), and follow a preprogrammed flight pattern (usually at night) to obtain images and video (and possibly infrared images, among others) of the growing plants. These recorded images and video, along with other information from all of the camera systems disclosed, such as temperature and humidity at particular times and locations, is automatically sent to a computer database 96 for processing in order to gauge the health of the system 10 as a whole, along with each plant's health, pest and/or disease issues, and plant life cycle. The system 10 can also check for lighting being evenly distributed, dry spots or wet spots throughout the structure (like puddling on the floor or dry plant sites).

Figure 8:
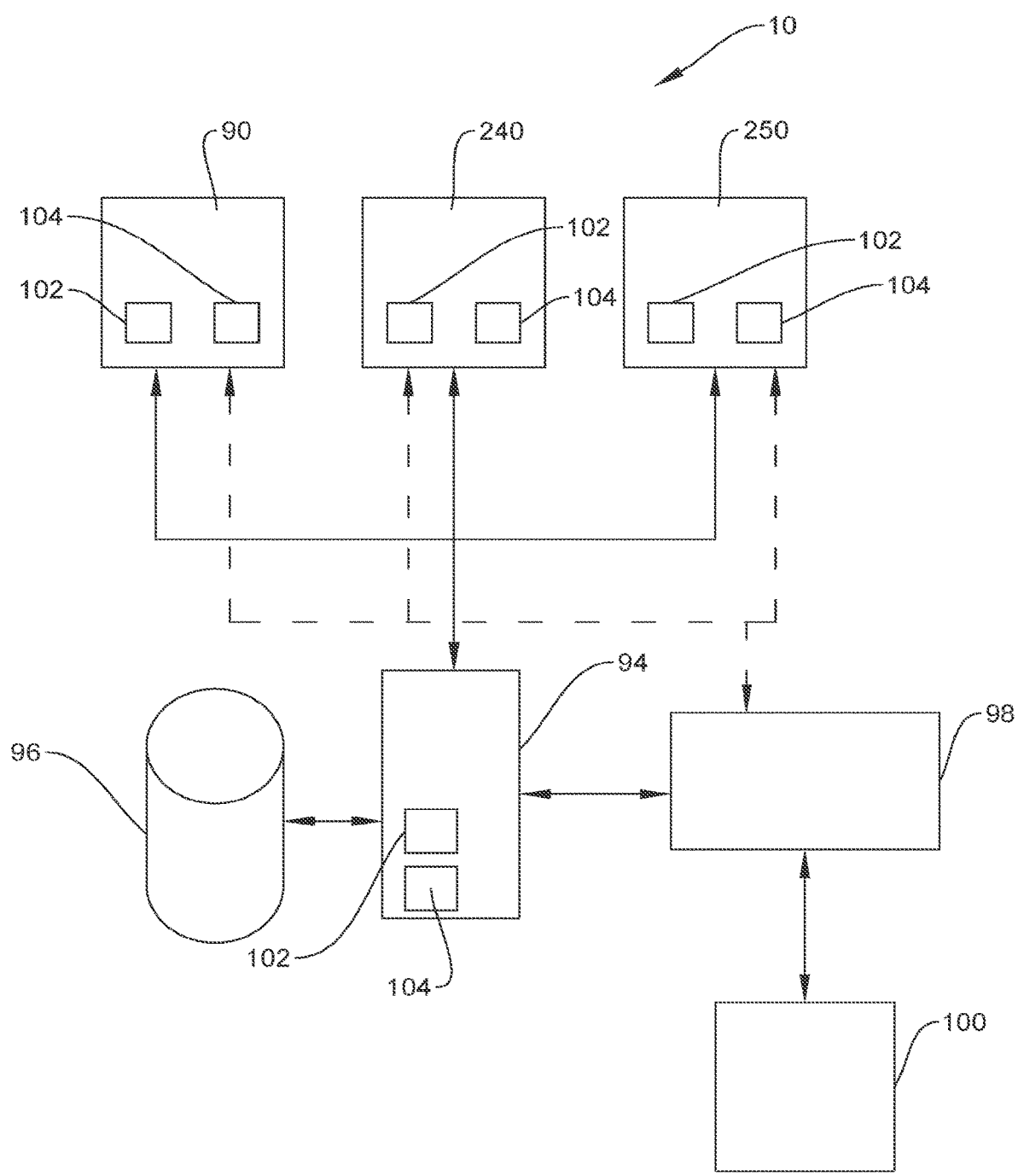
FIG. 8 is a block diagram view of an exemplary embodiment of a vertical farming system utilizing autonomous flying drones.

FIG. 8 is an exemplary block diagram of the vertical farming system 10 utilizing a drone 90 or camera system 240 or vehicle camera system 250 along with a computer system to control the cameras, access the images and videos captured by the camera systems 90, 240, 250, and determining the health of the vertical farming system 10 as a whole, along with each plant's health, including any pest and/or disease, and each plant's life cycle.

As such, the present disclosure further comprises custom software and a graphical user interface (GUI) that allows the system to autonomously or near-autonomously control one or more of the camera systems 90, 240, 250. The autonomous or manual control allows for the capture of images and video of some or all of the growing plants using a camera or cameras 92, 242, 256. Along those lines, the present invention contemplates the ability to electronically transmit plant-growing data to the computer system of the vertical farming system 10 for automatic or manual plant health determination.

As a non-limiting example of a processor system, FIG. 8 is a block diagram view of an exemplary vertical farming system 10 for growing plants. The vertical farming system 10 may include a plurality of camera systems 90, 240, 250 (three such combinations are represented in FIG. 8), a vertical farming support server 94 (which may be referred to herein as a vertical farming platform server 94), a vertical farming database 96, a vertical farming application programming interface ("API") 98, and a system user access 100, whereby vertical farming system users and others, such as distributors, consumers, restaurant owners, end users, programmers, etc., can access the vertical farming system 10 data for monitoring the growing plants, and upgrading the software, as necessary, among other reasons. The vertical farming system user access 100 can be a single site or multiple sites depending on the needs of the system 10. In the preferred embodiment, multiple sites are contemplated.

The present disclosure will be described with reference to embodiments in which the vertical farming system 10 utilize a vehicle camera system 250 autonomously, although all of the different camera systems 90, 240, 250 are contemplated. The vertical farming system users access the data through the system user access 100, connected to the vertical farming API 98. It should be understood, however, that the present disclosure is not limited to the preferred embodiment detailed herein; rather, the system, methods and functionality illustrated and described herein may be effected in other ways as understood by one having ordinary skill in the art.

For example, a restaurant owner may use one application program ("app") on a smart phone to access certain information about the vertical farming system 10, while a programmer may use an app to upgrade the software, and a system user may use an app to manually control an autonomous vehicle 252 to capture information about a particular plant or set of plants. Accordingly, the vertical farming system users may access the vertical farming API 98 through the vertical farming support server 94 or through the system user access 100.

Each of the camera systems 90, 240, 250 may be configured to be controlled autonomously with an onboard program, which may include a travel program, a docking and charging program and hardware and software to capture plant images and video and transmit the information to the vertical farming support server 94. Additionally, the vertical farming system 10 may include control of the different camera systems 90, 240, 250 autonomously or manually through the vertical farming support server 94 or through the system user access 100.

The vertical farming system 10 (which may be referred to herein simply as "the system 10") may include and provide a graphical user interface (GUI) having a number of features described above and below. Portions, or all, of the GUI may be provided by the vertical farming support server 94, in an embodiment. Accordingly, in an embodiment, the vertical farming support server 94 may be configured to perform one or more operations, methods, etc. described herein that enable various control, calculations and determinations for the system 10.

The vertical farming support server 94 may be configured to perform a number of functions to assist vertical farming system users in their decisions. For example, the vertical farming support server 94 may be configured to provide a daily or nightly control of the camera system 90, 240, 250 to capture the plant images and video, along with reading sensors in the vertical farming infrastructure or located on the camera systems 90, 240, 250 to determine if the vertical farming system 10 is operating within certain parameters. The vertical farming support server 94 can be configured to contact vertical farming users if the measurements exceed the acceptable range. These routines, programs and protocols may be obtained from the vertical farming support server 94, in an embodiment, from the vertical farming API 98 and/or from the system user access 100.

The vertical farming support server 94 may be further configured to store data in and retrieve data from the vertical farming database 96. Data stored in the vertical farming database 96 may include camera system 90, 240, 250 controls and docking programs in general, rotation of crop programs, specific plant health information, range of acceptable temperatures and humidity, plant health programs, etc., and similar information related to plant health determinations that may be performed through the vertical farming system 10.

The vertical farming database 96 may be or may include one or more data repositories including, but not limited to, one or more databases and database types as well as data storage that may not necessarily be colloquially referred to as a "database." The vertical farming database 96 may be configured to store the information described herein, and programs that may be performed through the vertical farming system 10, along with similar information related to the needs of the vertical farming system 10.

The vertical farming support server 94 may be in electronic communication with the camera systems 90, 240, 250 and with the vertical farming system users to obtain and deliver updated information, programs and routines, and other information, in an embodiment. In embodiments, the vertical farming support server 94 may be owned, controlled or operated by the vertical farming system user, a separate vertical farming facility, or some other entity. Furthermore, the vertical farming support server 94 may be a single server, or multiple servers acting in a redundant or additive capacity.

In embodiments, the camera systems 90, 240, 250 may be configured to perform one or more of the functions described herein with reference to the vertical farming support server 94 and/or the vertical farming system 10 or facility. Accordingly, the camera systems 90, 240, 250 may be in direct electronic communication with the vertical farming support server 94, the vertical farming database 96, the vertical farming API, and/or the system user access 100.

The camera systems 90, 240, 250 may include a processor 102 and a memory 104, and the vertical farming support server 94 may include a processor 102 and a memory 104. The processor 102 may be any appropriate processing device (and may be the same or different in each location). The memory 104 may be any volatile or non-volatile computer-readable memory (and may be the same or different in each location). The memory 104 may be configured to store instructions that embody one or more steps, methods, processes, and functions of the camera systems 90, 240, 250 and/or the vertical farming support server 94 described herein. The processor 102 may be configured to execute those instructions to perform one or more of the same steps, methods, processes, and functions. One or more of the camera systems 90, 240, 250 and/or the vertical farming support server 94 may be or may include a personal computer or mobile device (e.g., tablet, smartphone), in an embodiment.

Instead of, or in addition to, a processor 102, and memory 104, the vertical farming support server 94 and/or one or more of the camera systems 90, 240, 250 may include a programmable logic device (PLD), application-specific integrated circuit (ASIC), or other suitable processing device (not shown).

The programs and information described herein may be provided, in an embodiment, by both the camera systems 90, 240, 250 and the vertical farming support server 94. That is, some elements or features of the system 10 may be installed on the camera systems 90, 240, 250, and other elements or features of the platform may be provided by the vertical farming support server 94 (e.g., on a software-as-a-service (SaaS) basis). For example, the camera systems 90, 240, 250 may provide (i.e., may have installed) a program that includes a graphical user interface of the vertical farming system 10, and the vertical farming support server 94 may provide much of the underlying data, programs and protocol. However, storage and retrieval of data displayed in the vertical farming system 10, calculations performed by or under the vertical farming system 10, and services provided through the vertical farming system 10 may be performed by one or both of the camera systems 90, 240, 250 and the vertical farming support server 94.

Figure 9:
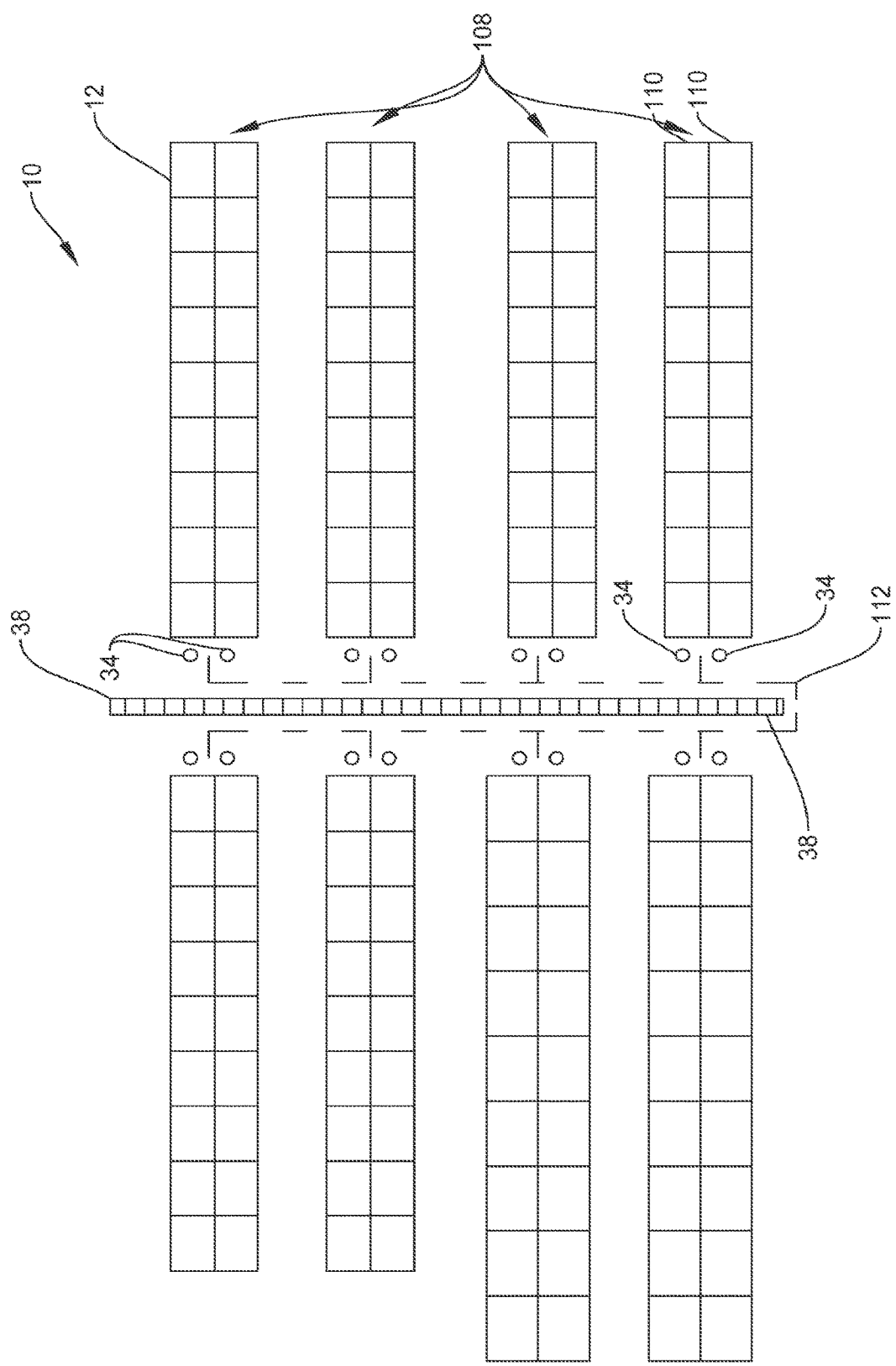
FIG. 9 illustrates an improved vertical farming system comprising a clustered grow rack and inter-cluster shuttle system in accordance with one embodiment of the present disclosure.

FIG. 9 shows an improved vertical farming system 10 (from a different top down viewpoint) comprising a shelving system 12, configured with multiple shelves or levels 14 (see FIG. 1), and comprising a cluster 108 configuration of back-to-back grow racks 110. In doing so, each cluster 108 consists of two back-to-back grow racks 110 of any length. Each cluster 108 will have one or two lift structures 34, which will be configured to transport a shuttle 46 (see FIG. 2) to any level in that cluster 108, thus enabling the shuttle 46 to pick any grow tray 200 on any level 14 and then deliver it to a central conveyor belt system 38. As such, a shuttle 46 can transport itself from cluster 108 to cluster 108 by way of a ground level rail system 112 that connects to each cluster 108, and a single shuttle 46 could service every single grow tray 200 position in any cluster 108 on the floor, and deliver that grow tray 200 to the central conveyor system 38. Additional shuttles 46 can be added to the same infrastructure, as the need for throughput increases and the system, as a whole, is scalable.

In an alternative embodiment, the same cluster 108 configuration can be utilized without the need for shuttles 46. Based on the slant of the shelf 14 and the lift 34, each grow tray 200 can be accessed and placed onto the ground level rail system 112 without the need for a shuttle, thereby reducing the cost of the overall vertical farming system 10. Additionally, a hybrid system can be utilized in which the grow trays 200 are used without a shuttle 46, while on the shelving system 12 and once removed for processing by the lift 34, each grow tray 200 is placed onto a shuttle for transport on the ground level rail system 112.

Figure 10:
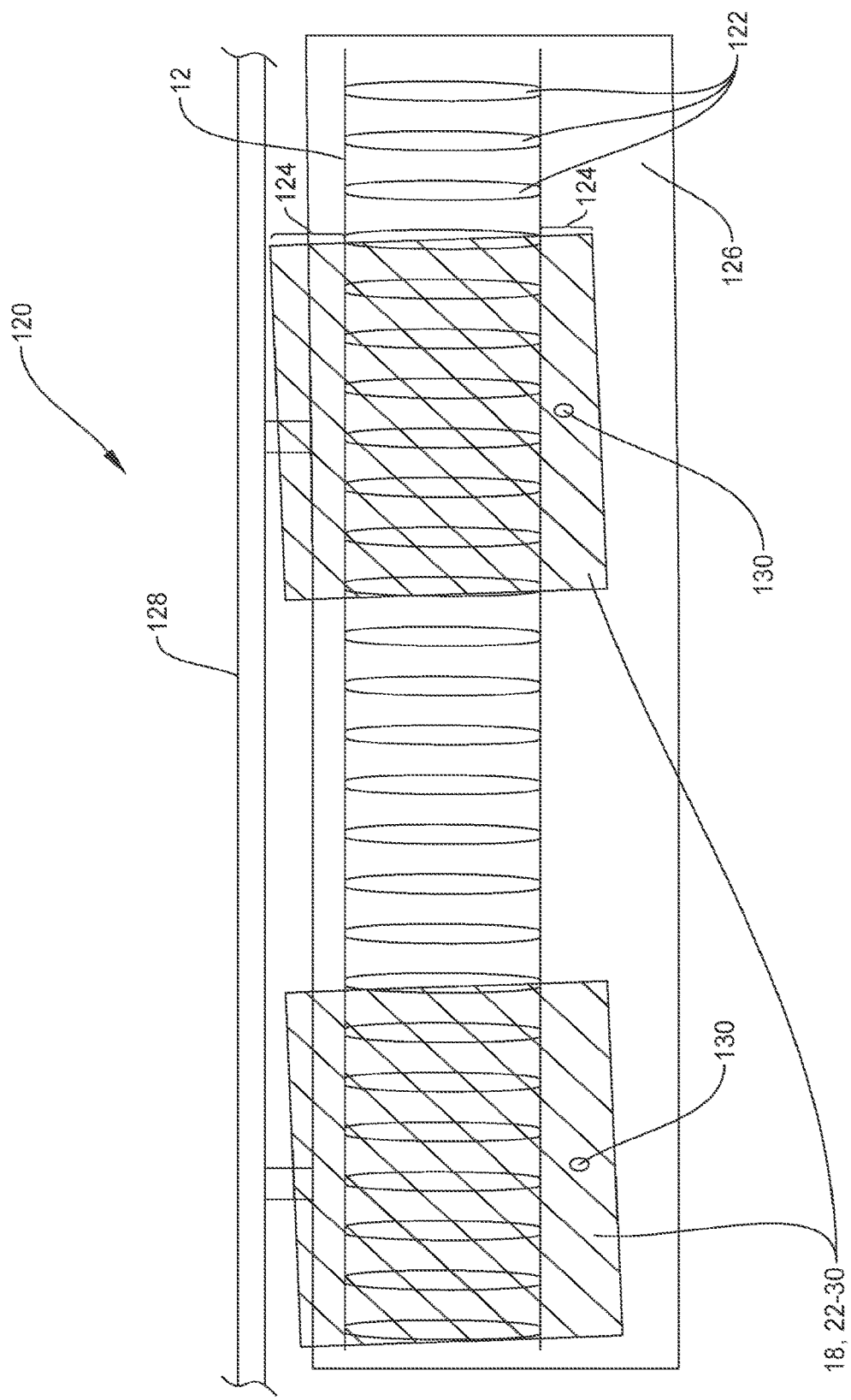
FIG. 10 illustrates an improved vertical farming system comprising a novel water supply, drain system and rollers for grow racks in accordance with one embodiment of the present disclosure.

FIG. 10 shows an improved vertical farming system 10 (from a top down viewpoint) comprising a shelving system 12, configured with multiple shelves or levels 14 (see FIG. 1) and comprising a novel water and draining system 120. In a preferred embodiment, two grow trays 200 can sit on top of a level of rollers 122, jutting out slightly on either end of the rollers 124. Under the rollers 122, and spanning the entire length of the level 14, and having a width larger than the grow tray 200 itself, is a trough style drain 126. The purpose of this trough drain 126 is so that the water supply 128 can feed directly into the grow tray 200 and then drain 130 out of the opposite end of the grow tray 200 into the trough drain 126. If a pallet or grow tray 200 is absent from its position, i.e., it has been unloaded, the water supply 128 will still feed directly into the trough drain 126 and recirculate back into the systems nutrient reservoir 16 (see FIG. 1). The trough 126 will be wider 124 than the rollers 122 so that any water 20 (see FIG. 1) being supplied or drained does not make any contact with the rollers 122.

Additionally, the rollers 122 will be positioned at an angle towards the drain 130, so that supplied water 20 will be pulled by gravity towards the grow tray's drain hole 130. The rollers 122 will also be angled towards the grow rack's lift 34, keeping in line with the gravity pulled pushback system. By having these two angles or slants, the water 20 is forced by gravity towards the drain 130, while the grow tray 200 is forced by gravity towards its unloading location on the conveyor belt structure 38.

Figure 11:
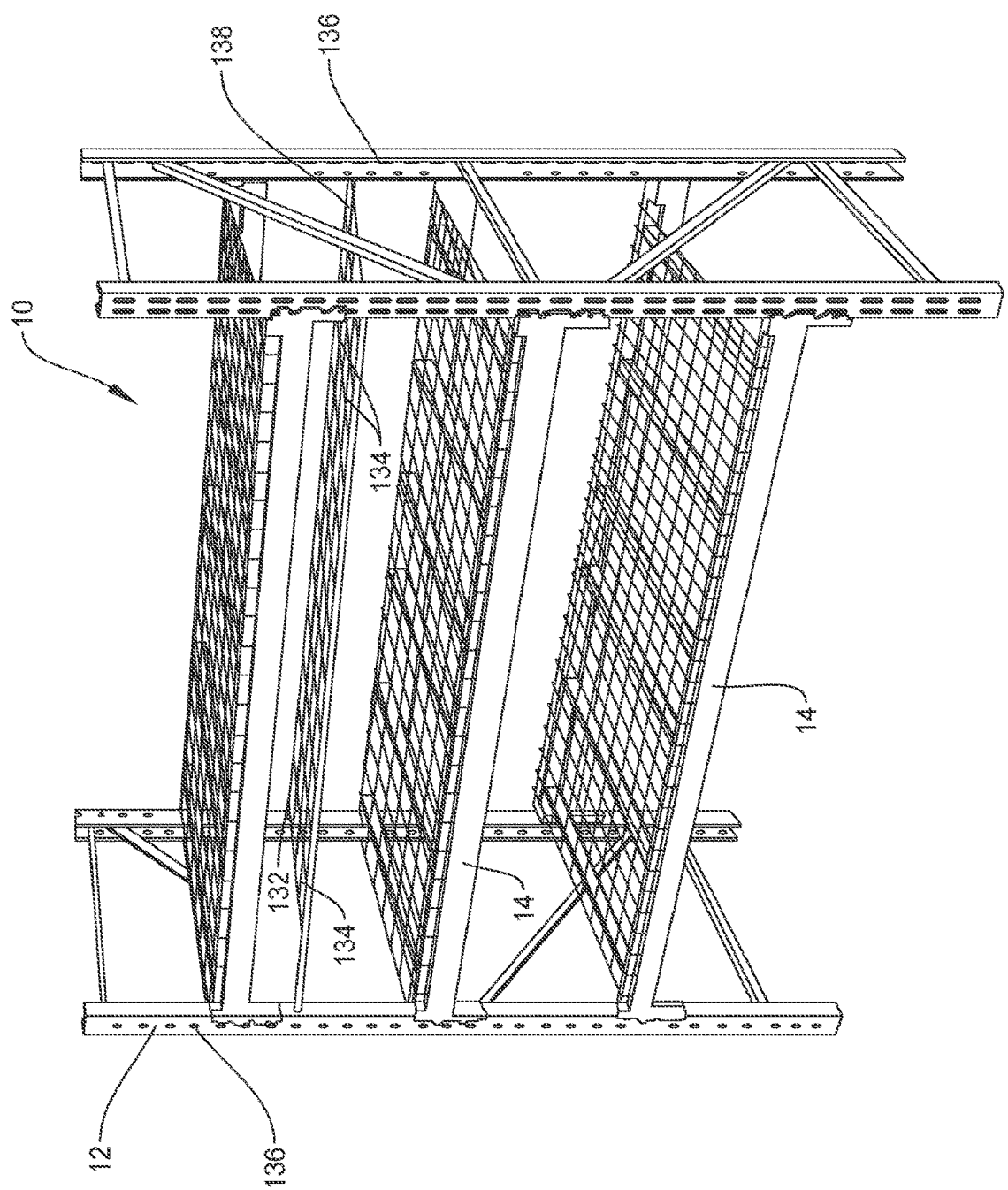
FIG. 11 illustrates an improved vertical farming system comprising a novel modular lighting system in accordance with one embodiment of the present disclosure.

FIG. 11 shows an improved vertical farming system 10 (from a perspective viewpoint) comprising a shelving system 12, configured with multiple shelves or levels 14 (see FIG. 1) and comprising a novel modular lighting system 132. The disclosure comprises a wire level 134 that can hook directly into the pallet racking holes 136. Attached to that wire level 134, are LED lighting bars 138 (two of them).

To the extent it is determined by the system 10 that the distance from the LED lights 138 to the plant canopy grow trays 200 needs to be adjusted, it can be accomplished without disassembling the entire shelving system 12. To move the LED lights 138, the entire wire level 134 is unhooked, and moved the desired distance from the plant canopy, completely avoiding the uninstallation and reinstallation of the shelving system 12 and/or LED light bars 138. The process could further be automated by attaching the wire level 134 to a series of rods and gears (not shown) or motors and having the system 10 detect through sensors and the database 96 when the LED light bars 138 need to be moved and how far to adjust them.

Figure 12:
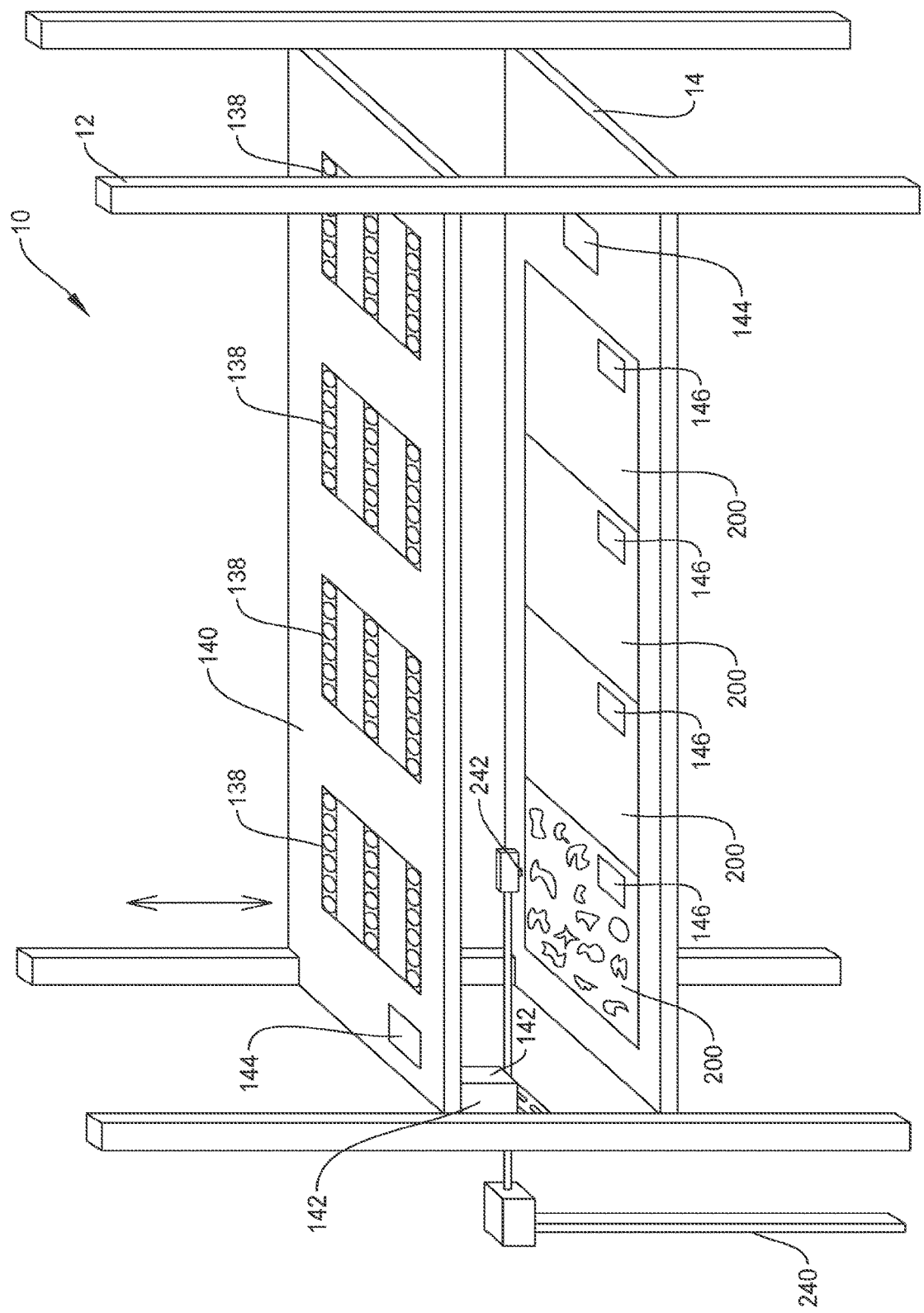
FIGS. 12 and 13 illustrate improved vertical farming systems comprising an alternative novel modular lighting system in accordance with one embodiment of the present disclosure.
Figure 13:
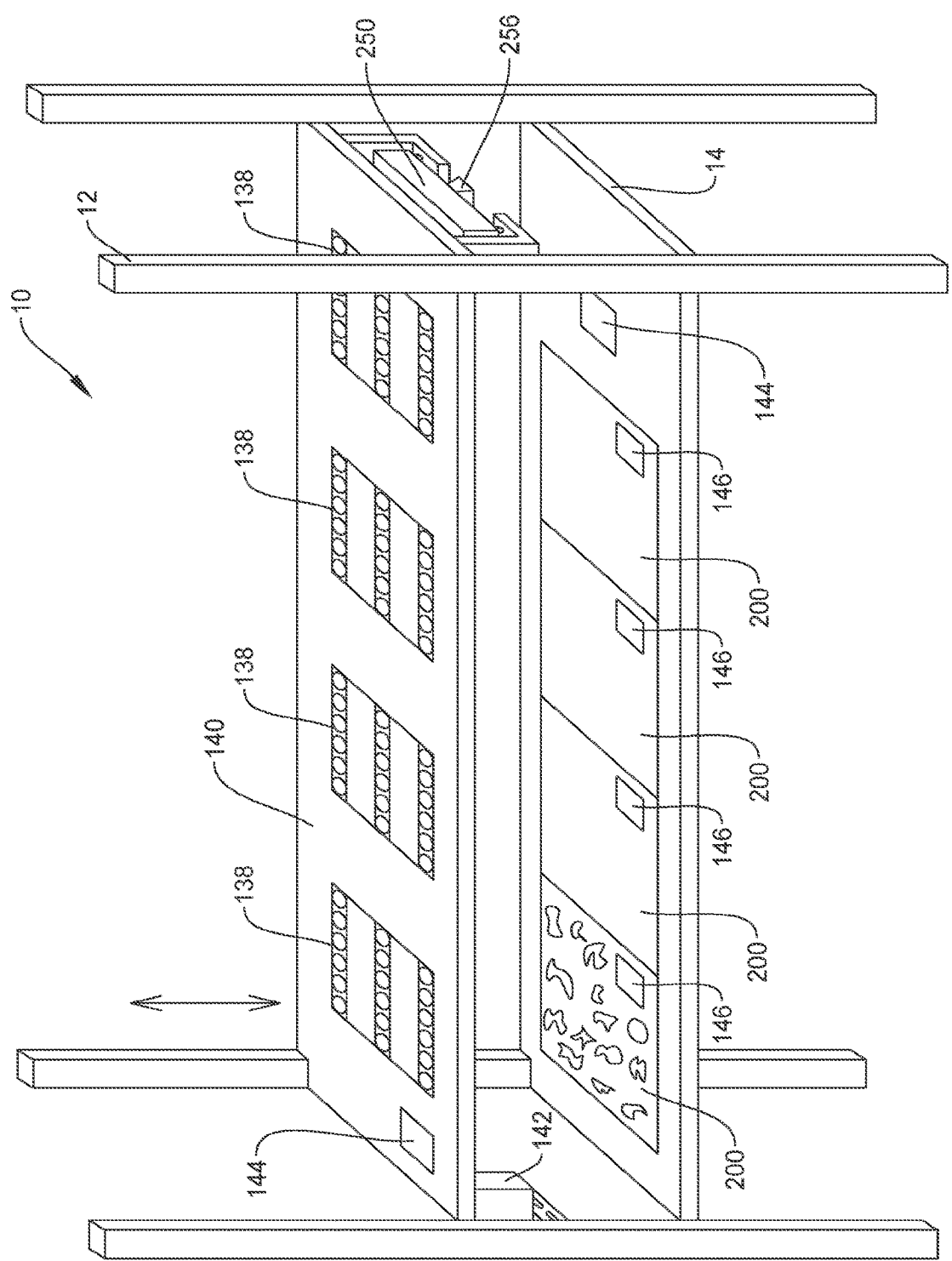

FIGS. 12 and 13 show different perspective views of an alternative embodiment to the novel modular lighting system 132 in FIG. 11. This embodiment includes a motor and feedback for automating the raising and lowering of the lighting bars 138. In FIGS. 12 and 13, the LED lighting bars 138 are integrated into a lighting platform 140, which is connected to the shelving system 12, but can be raised and lowered above the grow trays 200 using a motor 142, such as a stepper motor, for example. Stepper motors are highly reliable, work in almost any environment, and provide precise positioning for starting, stopping and reversing.

The motor 142 provides feedback to the vertical farming system 10 as to the distance the lighting bars 138 are from the grow tray 200 and, in effect, the growing plants. As such, a history can be generated of the distance of the lighting bars 138 from a particular grow tray 200 and the plants in that grow tray 200 during the entire life of the plants from seed to harvest. That history can be included in the database 96 of all of the similar plants for optimizing the growth of the plants.

Additionally, sensors 144, such as temperature and humidity sensors can be placed in or incorporated into the grow trays 200 or elsewhere to determine additional information for the database and for ultimately obtaining the optimal temperature and humidity for growing plants. The sensors 144 can also be incorporated into the shelving system 12 of the vertical farming system 10 so that at any particular time, the system 10 knows where a particular grow tray 200 is located and the conditions surrounding that grow tray 200 during the plant life cycle. Either way, the information obtained from the sensors 144 can be used in conjunction with (or in addition to) the distance of the lighting bars 138 at any particular time or for the entire life of the plant to further optimize growing conditions.

As such, the changing distance of the overhead lighting bar 138, in association with the existing database 96 of the vertical farming system 10 creates a Dynamic Light Zoom (DLZ), which can be (computer) controlled to maintain constant Photosynthetic Photon Flux Density (PPFD) exposure throughout the plant growth stages (i.e., seedling, vegetative, reproduction). Plant PPFD values are autonomously and automatically adjusted and/or maintained in real-time through sensor 144 data analysis, such as proprietary algorithms (including machine learning and artificial intelligence) and the raising and lowering of the lighting platform 140 containing the lighting bars 138. As described, sensors 144 include, but are not limited to, distance sensors (e.g., ultrasonic, infrared) and optical sensors (e.g., photodiodes, phototransistors, ultraviolet-cameras, visible Spectrum cameras, near-infrared cameras, infrared cameras, thermographic cameras). The motor and/or sensors (or sensor systems) can be configured to provide feedback to the vertical farming system as to the distance the lighting bars and/or LED sheets are from the growing plants.

Additionally, and as disclosed herein, the system cameras 92, 242, 256, which can be incorporated into the camera systems 90, 240, 250, could also be mounted to the lighting platforms 140 (or other areas on the vertical farming system 10). When the system desires to capture an image (or a video, such as time lapse video), the lighting platform 140 can autonomously raise to an appropriate height to capture as many of the plants as possible, and then autonomously return to the height most appropriate for optimal plant growth. The cameras described herein, mounted to the DLZ can be instead of or in addition to the cameras 92, 242, 256, disclosed herein, with the DLZ mounted cameras have at least all the same functionality.

The lighting bars or lighting fixtures 138, which can be proprietary and/or commercially available, are mounted to the lighting platform 140 that can be mechanically raised and/or lowered, automatically or manually. Regardless of the type of raising and lowering of the lighting platform 140, the system will keep track of the distance and the temperature/humidity (or any other metrics being monitored by the sensors 144).

The PPFD maintained by the DLZ is user defined and will be revised over time, depending on the feedback of the growing environment. Lighting bars 138 can be maintained at a specified height above the grow trays 200, and thus the growing plant canopy, and the lighting bars 138 can be adjusted autonomously to a height above the growing plant canopy to maintain a specified PPFD, or a combination of a specified height above the growing plant canopy and a specified PPFD exposure to the growing plant canopy.

In accordance with the present disclosure, a novel manufacturing system for vertical farming is contemplated in which the parts and materials used to build and enlarge the rack system 12 are configured to allow for ease of building and enlarging without the need for separate conduit, ductwork or electrical connections. The rack system 12 design allows for the transfer or transport of supplies and resources necessary for plant growth without separate connecting designs. The rack structure manufacturing system utilizes predesigned and preformed materials, such as extruded aluminum or extruded plastic, comprising hollow cavities, for transporting and transferring irrigation, energy, materials and environments from one place to another without the need for separate conduit, ducts or connections.

As a non-limiting example, the rack structure system 12 of the present disclosure can be designed to be originally built, or later enlarged, without the need for designing separate conduit for irrigation. The rack structure system 12 is designed and extruded to include hollow cavities for transferring water from a single input location on the rack structure 12 to an area where it can be diverted to the grow trays for irrigation purposes. Further, the same rack system 12 can be designed with additional hollow cavities to allow for irrigation draining once the water has matriculated through each of the grow trays 200 on a level 14 or in a cluster 108. With this system, once the rack structure 12 is built (without separate water conduit or hoses), the water supply can be connected to the water input, and the exiting water can be connected to the drain and the rack structure system 12 will automatically transport water to each location for irrigation, redistribution or removal, regardless if the rack system 12 is four levels high or eight levels high, and if the rack structure 12 has clusters of 300 plants per level (5 grow trays at 60 plants per grow tray), or 1440 plants per level (20 grow trays at 72 plants per grow tray).

The same design can be used to transport or force cooling or heating air and/or humidity to the plants. The additional hollow cavities in the rack structure 12 allow for cooling or warming air from an HVAC system to enter the rack at a single location and be transported to various exit points to cool, heat or humidify the growing plants based on the needs that the system has determined, ostensibly from sensing the plants. The various exit locations can be vented automatically so that the system can determine what each plant needs and control the system accordingly. Again, as the rack system 12 is built or enlarged, the hollow cavities will be automatically connected for case of design and build purposes.

The rack structure 12 can also be designed to allow electricity and other necessary energy to be connected at a single point and be delivered to various points on the rack system for use in lighting, sensors, cameras, and other needs. As the rack system 12 is built or enlarged, each extruded piece connects with the other pieces to create the necessary conduit, ducts or connections. This will allow the entire grow structure 12 to function as a large, simple appliance, with one input for electricity, one input for water, and one input for air, as well as other built-in mounting points and rails for camera systems. This will significantly reduce the cost and complexity of existing vertical structure designs.

Additionally, as described above, the environmental database 96 can incorporate information obtained by stationary cameras and/or camera systems 90, 240, 250 throughout the vertical farming system 10. Further, each grow tray 200 may include a pallet identification 146, such as a barcode, RFID tag or QR code, as understood by one having ordinary skill in the art, allowing the vertical farming system 10 to automatically keep track of a particular grow tray 200 or even a particular plant. As such, a particular grow tray 200 can be monitored for input (water and fertilizer), information or metrics throughout the plant growth stages (temperature and humidity) and at harvest (time and yield), with the information being stored in the database 96 and used to optimize future growing environments.

The present disclosure also comprises an autonomous or near-autonomous harvesting system 300. As described above, when harvesting heads of lettuce for example, the full head must be manually cut at its base to detach it from the ground or from the grow media. Next, the leaves are manually cut from or removed from the head of lettuce for packaging, until only the core of the head remains, which will be discarded. As such, the process involves many steps, and often, multiple individuals. The autonomous harvesting system 300 eliminates a substantial portion of this manual process by harvesting in place. This is possible since based on the improved vertical farming system 10, the location of the center of each plant site is known for certain. Accordingly, the plant can be harvested in the same grow tray, in a one-step process.

Figure 14A:
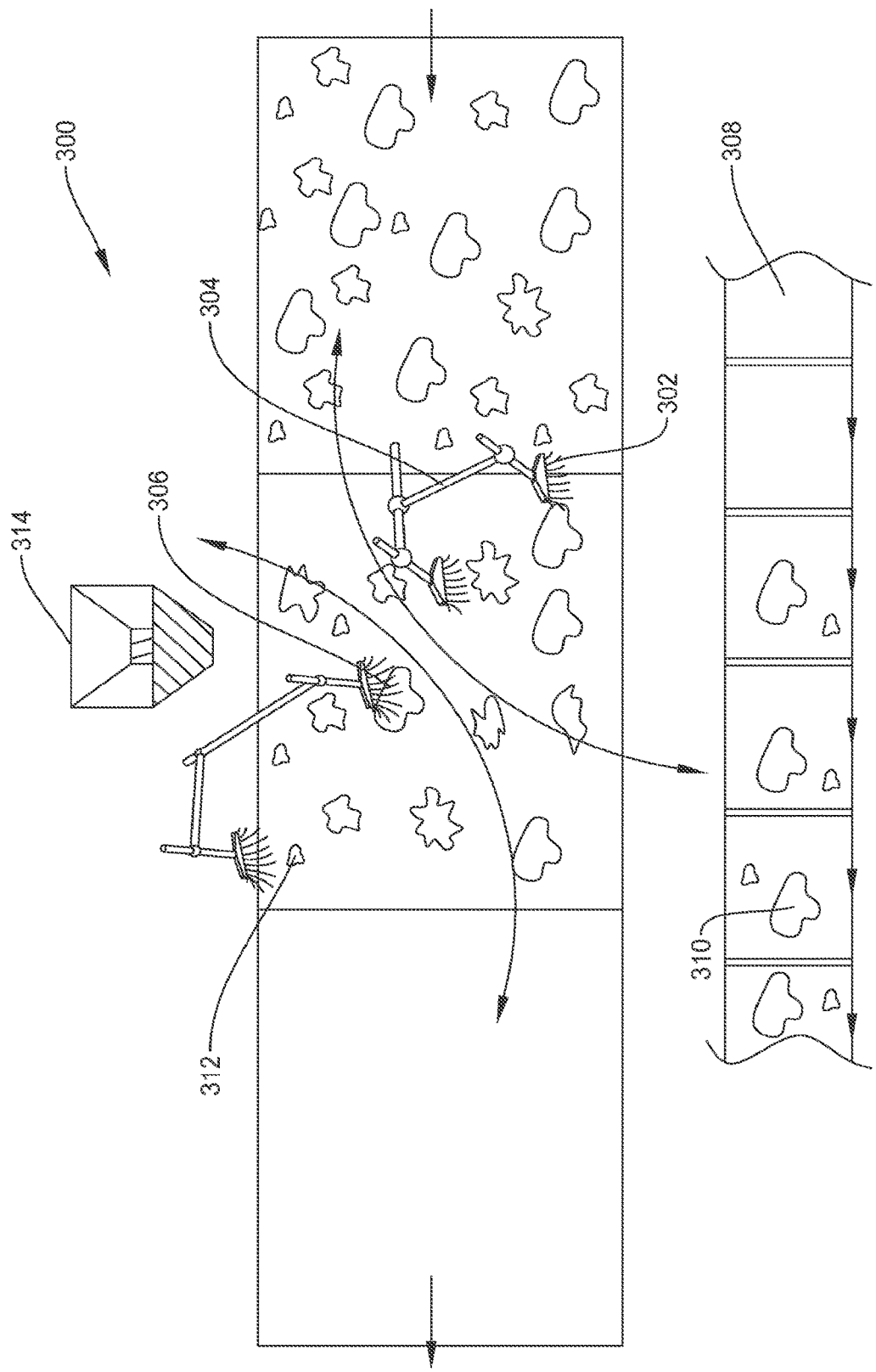
FIGS. 14A-14B illustrate improved vertical farming systems comprising an automatic harvesting systems in accordance with one embodiment of the present disclosure.
Figure 14B:
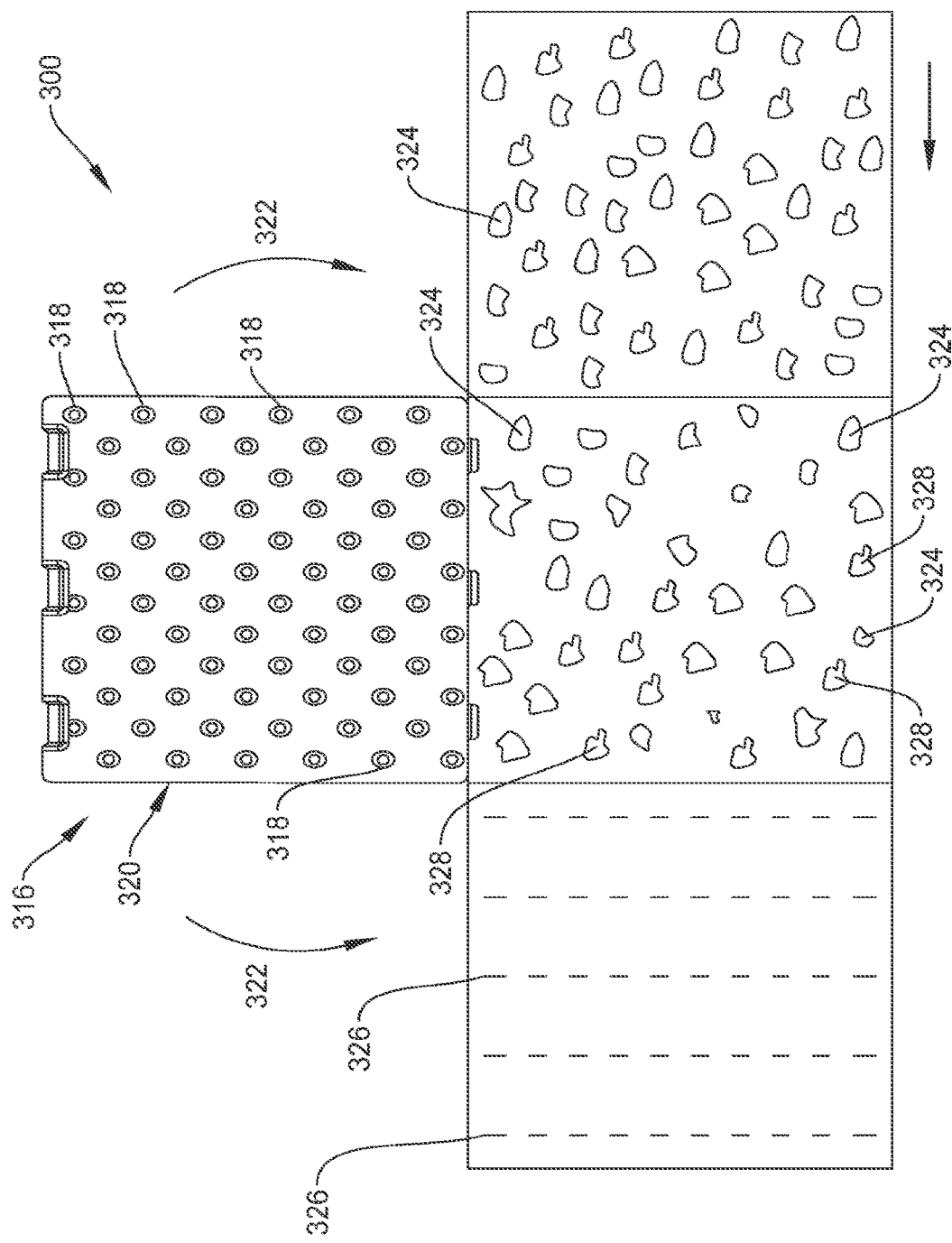

FIGS. 14A and 14B show the harvesting systems 300 of the present disclosure in which the plant is harvested autonomously in the grow tray to reduce harvesting steps and time. FIG. 14A shows an articulating harvester 300 in accordance with the present disclosure. The articulating harvester consists of a base 302 to hold the articulating harvester 300 in place, and articulated robot arm 304, which can be programmed to move in multiple axes so that each plant on a particular grow tray can be accessed, and a corer 306 at the end of the robot arm 304. The corer 306 can core or harvest each plant in the grow tray 200 one at a time to separate the leaves from the head of lettuce (for example) at high speed.

The leaves can then be removed for additional processing or packaging, either by tipping the grow tray 200 with a pneumatic arm or piston (not shown), causing all of the loose leaves to fall onto a conveyor belt or basket 308, resulting in only the wanted leaves 310 being harvested, with no waste or unwanted plant matter commingled with the leaves 310. The remaining cores 312 can be placed into a hopper 314 for further processing or discarding.

The articulating harvester also consists of a vision system and software capable of detecting which heads of lettuce might not pass quality control standards, and then skip the harvesting of that particular head, leaving it in place to be discarded with the other cores. This real time quality control at the time of harvest, will greatly reduce the amount of human labor necessary at a later time, in the packaging process, and will simultaneously increase the quality of the leaves being packaged.

FIG. 14B shows a harvesting system 300 comprising a harvesting press 316 in accordance with the present disclosure. The harvesting press 316 would be similar to or the same size as, a grow tray 200, with multiple corers 318 strategically mounted in a mirror image press 320 of the plant sites in the grow tray 200. The corers 318 could vary in diameter based on the particular plant or crop being harvested, and might be configured to spin, to make the coring process simpler. The harvesting press 316 would drop down in a single motion 322 against the grow tray 200, simultaneously coring all of the plant sites 324, resulting in the cores 326 remaining in their sites, and the loose leaves 328 separated on the tray. Again, the leaves 328 can then be removed for additional processing or packaging, either by tipping the tray with a pneumatic arm or piston (not shown), causing all of the loose leaves to fall onto a conveyor belt or basket (see FIG. 14A), resulting in only the wanted leaves 328 being harvested, with no waste or unwanted plant matter commingled with the leaves 328. The remaining cores 326 can be placed into a hopper (see FIG. 14A) for further processing or discarding.

These "harvest in place" harvesting systems 300 allow for the harvesting of multiple lettuce heads in exactly the same place that they grew during their life cycle, eliminating any unnecessary steps and monumentally increasing throughput and efficiency in the harvesting process.

It will be understood that the embodiments of the present disclosure, which have been described, are illustrative of some of the applications of the principles of the present disclosure. Although numerous embodiments of this disclosure have been described above with a certain degree of particularity, those skilled in the art could make numerous alterations to the disclosed embodiments without departing from the spirit or scope of this disclosure.

All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosed system and methods.

Additionally, joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosed apparatus, system and methods as disclosed herein.

The invention claimed is:

1. A vertical farming system for optimizing a plant growing process, comprising:

a shelving system, said shelving system comprising a plurality of shelves, said plurality of shelves comprising a first shelf having a first shelf end and a second shelf end with said first shelf end being located higher than said second shelf end, said first shelf comprising a plurality of shelf rollers;

said first shelf accepting and securing a plurality of grow trays, said plurality of grow trays comprising a first grow tray located adjacent to a second grow tray on said first shelf, said plurality of shelf rollers rotating such that a said first grow tray and said second grow tray when placed on said rollers adjacent to each other and unimpeded, will both be transported from said first shelf end to said second shelf end using said rollers and gravitational force;

said first grow tray comprising a first grow tray side and a first grow tray port level, said first grow tray side comprising a first grow tray port, said second grow tray comprising a second grow tray side, said first grow tray side of said first grow tray adjacent to and higher than said second grow tray side of said second grow tray such that when said first grow tray fills with water to said port level, the water will cascade out of the first grow tray port, over the second side of the second grow tray and into said second grow tray;

a lift, said lift positioned at the said second shelf end of said first shelf, said lift removing said second grow tray from said second shelf end;

wherein when said first grow tray is placed adjacent to said second grow tray and water poured into said first grow tray reaches said first grow tray port level, the water will flow from the first grow tray port into the second grow tray thereby filling the second grow tray and optimizing the plant growing process.

2. The vertical farming system for optimizing a plant growing process in claim 1, wherein said lift moves said second grow tray to a second shelf of the plurality of shelves.

3. The vertical farming system for optimizing a plant growing process in claim 1, further comprising a camera system, said camera system comprising a camera taking pictures of said plurality of grow trays on said plurality of shelves.

4. The vertical farming system for optimizing a plant growing process in claim 3 wherein said camera wirelessly transmits pictures to a database of pictures.

5. The vertical farming system for optimizing a plant growing process in claim 4 wherein an application programming interface uses the database of pictures to optimize said plant growing process.

6. The vertical farming system for optimizing a plant growing process in claim 5 wherein said database of pictures is used to determine a plant condition in one of said plurality of grow trays.

7. The vertical farming system for optimizing a plant growing process in claim 5 wherein said application programming interface comprises a user interface to access the database of pictures.

8. The vertical farming system for optimizing a plant growing process in claim 7 wherein a third-party vendor accesses said user interface to determine a plant condition in one of said plurality of grow trays.

9. The vertical farming system for optimizing a plant growing process in claim 1 wherein said shelving system comprises hollowed supports for transferring water to said plurality of grow trays.

* * * * *